(12) United States Patent
van der Veer

(10) Patent No.: US 7,620,082 B2
(45) Date of Patent: Nov. 17, 2009

(54) METHOD AND APPARATUS FOR SEEDING AND STABILIZING AN OPTICAL DEVICE

(75) Inventor: Wytze E. van der Veer, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 91 days.

(21) Appl. No.: 11/799,285

(22) Filed: Apr. 30, 2007

(65) Prior Publication Data

US 2008/0170597 A1    Jul. 17, 2008

Related U.S. Application Data

(63) Continuation-in-part of application No. 11/654,873, filed on Jan. 17, 2007.

(51) Int. Cl.
*H01S 3/13* (2006.01)
(52) U.S. Cl. .......................... 372/29.011; 372/29.023; 372/32; 372/38.01
(58) Field of Classification Search ........... 372/29.011, 372/29.023, 32, 38.01
See application file for complete search history.

(56) References Cited

U.S. PATENT DOCUMENTS

| | | | | |
|---|---|---|---|---|
| 4,907,237 | A * | 3/1990 | Dahmani et al. | 372/32 |
| 5,940,418 | A * | 8/1999 | Shields | 372/22 |
| 6,633,596 | B1 * | 10/2003 | Wulfmeyer et al. | 372/32 |
| 2006/0078011 | A1 * | 4/2006 | Lucht et al. | 372/21 |
| 2006/0215714 | A1 * | 9/2006 | Luo et al. | 372/29.02 |
| 2007/0268940 | A1 * | 11/2007 | Luo et al. | 372/20 |

* cited by examiner

*Primary Examiner*—Minsun Harvey
*Assistant Examiner*—Joshua King
(74) *Attorney, Agent, or Firm*—Daniel L. Dawes; Marcus C. Dawes

(57) ABSTRACT

A method for seeding and stabilizing an optical device, wherein the optical device includes one of a continuous wave laser, a pulsed laser, and a parametric system, the method including seeding the optical device with a seed signal, generating a feedback signal from an output of the optical device, and adjusting a wavelength of the seed signal to maintain a stable operation of the optical device based on the feedback signal. An apparatus, including an optical device having a cavity, a seed laser for generating a seed signal coupled to the optical device, a feedback generator coupled to the output of the optical device for generating a feedback signal, and means for adjusting a wavelength of the seed laser to maintain a stable operation of the optical device based on the feedback signal.

16 Claims, 23 Drawing Sheets

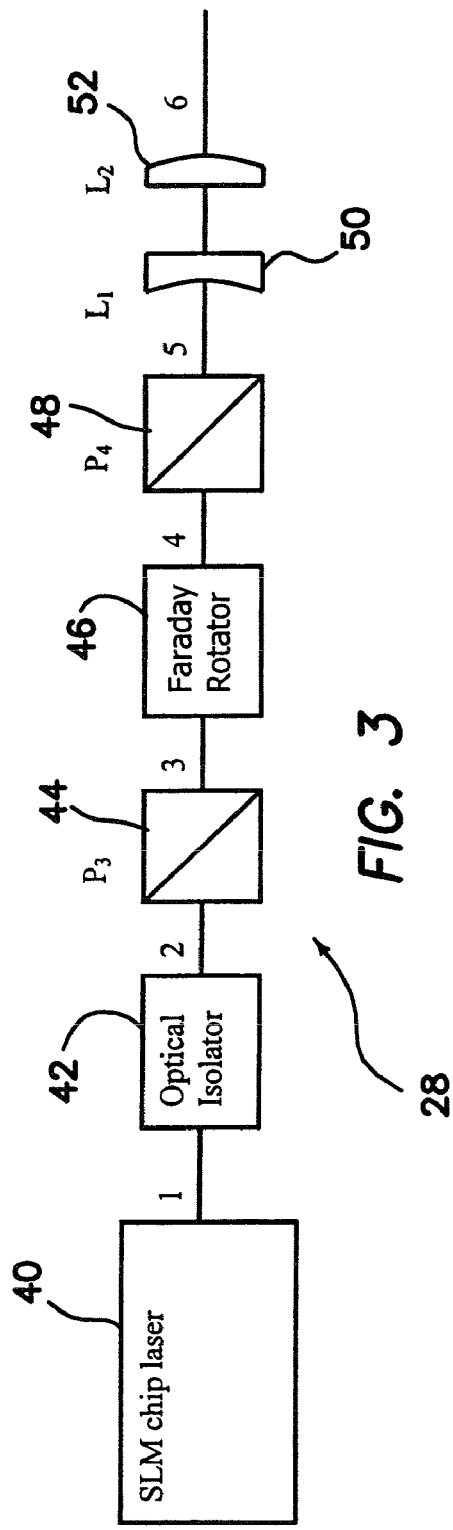
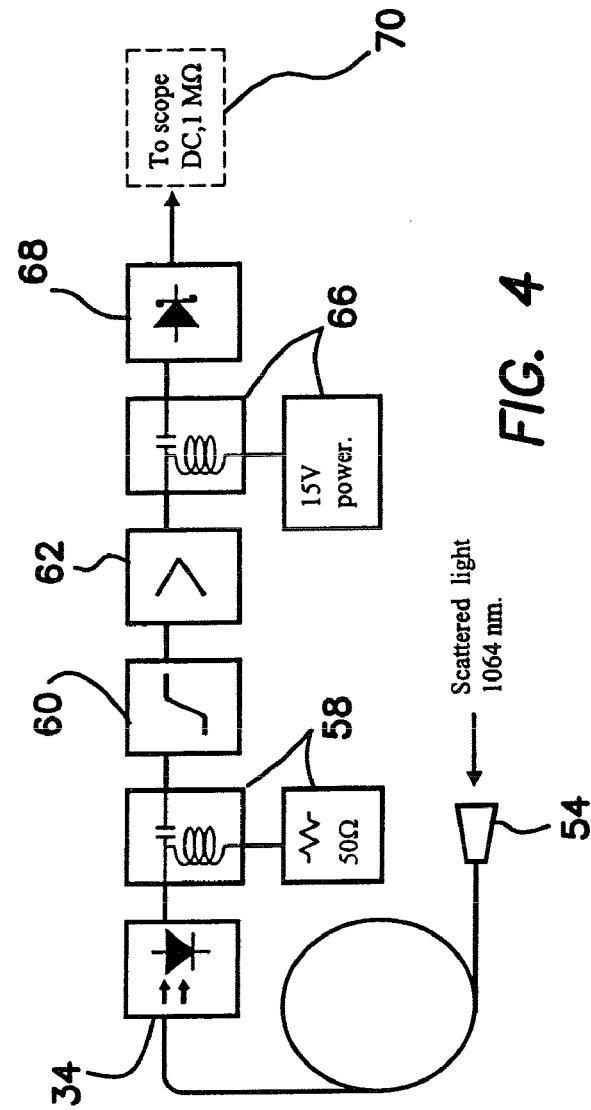
FIG. 3
FIG. 4

Fig. 14a
Fig. 14b
Fig. 14c
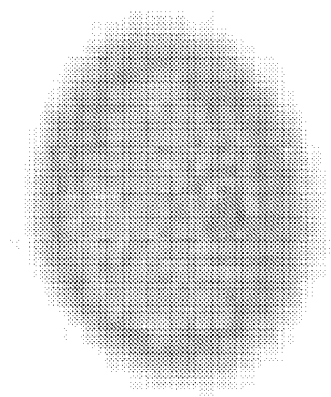
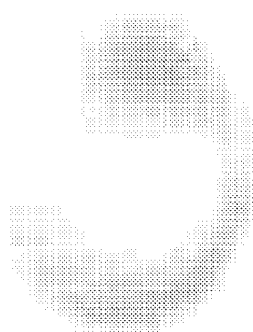

METHOD AND APPARATUS FOR SEEDING AND STABILIZING AN OPTICAL DEVICE

CROSS REFERENCE TO RELATED APPLICATIONS

The present application is a Continuation-In-Part of U.S. patent application Ser. No. 11/654,873, filed Jan. 17, 2007, and incorporated herein by reference in its entirety.

BACKGROUND OF THE INVENTION

1. Field of the Invention

The invention relates to the field of apparatus and methods for the stabilization of the operation of a laser or another optical device.

2. Description of Related Art

Pulsed, Q-switched solid-state lasers are an almost ubiquitous light source for powerful, short laser pulses, as used in industry and research labs. Typically, a simple, free-running cavity design is employed, while more demanding applications require seeded lasers. In the latter case, a narrow-bandwidth, continuous wave (CW) laser beam is introduced into the cavity of the host laser. The wavelength of the CW laser is adjusted to coincide with the fluorescence maximum of the gain material of the host. When the CW laser is resonant with one of the cavity modes of the host, this mode will win the mode competition for the population inversion in the gain material with regard to the other longitudinal modes present in the free running host laser.

When the host laser is seeded, the bandwidth produced is reduced dramatically. In the case of an un-seeded Nd:YAG laser, the width of the fluorescence maximum at 1064 nm is ~20 GHz, while the bandwidth of a seeded Nd:YAG laser with a pulse duration of 8 ns is typically 0.1 GHz, a factor of 200 smaller than that of the un-seeded laser. The narrow bandwidth is required for applications in spectroscopy, and for pumping narrow-bandwidth optical parametric oscillators (OPO). Similarly, the coherence length of these light pulses increases from ~1.5 cm to 3 meters, which is important for coherent detection schemes, such as coherent Laser Imaging Detection and Ranging (Lidar), and Coherent Anti-Stokes Raman Scattering (CARS).

The seeded lasers also show superior pulse characteristics. In free-running, Q-switched lasers, each pulse is modulated by beating between the longitudinal modes generated in the cavity. Because of the random nature of these modes, each consecutive pulse shows a different shape. The free running modes are built up from the vacuum background. The time required to build up a mode is also subject to random behavior, causing jitter in the timing of the generated pulse.

In seeded lasers the pulse is built up from the injected radiation, eliminating the random behavior. The generated radiation only contains one longitudinal mode and, as a result, no beating artifacts.

Seeded Nd:yag lasers are currently available from a number of suppliers, such as Continuum (coherent), Spectra physics, and Quantel. Most of these are expensive mainframe lasers, e.g. more than $100,000 in 2006. All these lasers are based on the same design as shown in FIGS. 1a and 1b. In these lasers, the Q-switch is formed by a polarizer 14 and a Pockel's cell 30 placed in front of the back reflector 12 of the cavity. The seed-beam is brought into the cavity via the polarizer with the same polarization as the reflected beam. The electronic speed of the Pockel's cell 30 is reduced, increasing the build-up time of the pulse in the oscillator. The timing of the generated pulse is then observed with a photo diode. The rear mirror 12 in the lasers is mounted in a piezo-electric element 32, and its position is dithered. A lock-in scheme then allows minimizing the build-up time of the oscillator, making the cavity resonant with the seed-beam. The cavity of the host laser is also fitted with two quarter-wave plates, so that the beams traveling either way through the cavity have opposite circular polarization. In this way, the generation of a second longitudinal mode through spatial hole burning is prevented.

BRIEF SUMMARY OF THE INVENTION

The illustrated embodiment of the invention is directed to a method for seeding and stabilizing an optical device, wherein the optical device includes one of a continuous wave laser, a pulsed laser, and a parametric system, the method including the steps of seeding the optical device with a seed signal, generating a feedback signal from an output of the optical device, and adjusting a wavelength of the seed signal to maintain a stable operation of the optical device based on the feedback signal.

The illustrated embodiment of the invention is directed to an apparatus, including an optical device having a cavity, a seed laser for generating a seed signal coupled to the optical device, a feedback generator coupled to the output of the optical device for generating a feedback signal, and means for adjusting a wavelength of the seed laser to maintain a stable operation of the optical device based on the feedback signal.

The invention expressly includes within its scope an apparatus in which any one of the above methods are performed. Although illustrated embodiments are a Q-switched Nd:Yag or Brilliant A pulsed laser, the principles of the invention can literally be applied to other types of lasers, including continuous wave lasers and to any parametric optical device whose structure or a system and combination of devices in which at least one of the components of the system or combination has in whole or part a variable effective optical cavity length.

In particular the illustrated embodiment of the invention is a method for seeding and stabilizing an optical device, wherein the optical device comprises one of a continuous wave laser, a pulsed laser, and a parametric system. The method comprises the steps of seeding the optical device with a seed signal, generating a feedback signal from an output of the optical device, and adjusting a wavelength of the seed signal to maintain a stable operation of the optical device based on the feedback signal.

In one embodiment the step of seeding the optical device comprises the step of introducing a seed beam into a cavity of the optical device from outside of the cavity of the optical device.

In another embodiment the step of introducing a seed beam into the cavity of the optical device from outside of the cavity of the optical device comprises the step of introducing a seed beam into the cavity of the optical device using a polarizer in front of the cavity of the optical device.

In one other embodiment the optical device is a Q-switched pulsed laser, and the step of seeding the optical device comprises the step of introducing a seed beam into a cavity of the Q-switched pulsed laser from outside of the cavity of the Q-switched pulsed laser.

In still another embodiment the optical device is a Q-switched Nd:Yag laser, and the step of seeding the optical device comprises the step of introducing a seed beam into the cavity of the Q-switched Nd:Yag laser from outside of the cavity of the Q-switched Nd:Yag laser.

In one embodiment step of seeding the optical device with a seed signal comprises the step of generating the seed signal from a tunable laser.

In yet another embodiment the step of adjusting the wavelength of the tunable laser to maintain the stable operation of the optical device comprises the step of dithering the wavelength of the tunable laser to maintain the stable operation.

In an embodiment the step of adjusting the wavelength of the seed signal to maintain the stable operation of the optical device comprises the step of adjusting a drive current for a tunable source for generating the seed signal.

In another embodiment the step of adjusting a drive current for a tunable source for generating the seed signal comprises the step of adjusting a tunable distributed Bragg reflector (DBR) laser.

In one embodiment the step of generating the feedback signal from the output of the optical device comprises the steps of detecting signals associated with an envelope of optical pulses produced by the optical device, generating independent signals for the pulse intensity of the optical pulses and a radio frequency (RF) modulation of the optical pulses from the detected signals, generating the feedback signal to minimize the RF modulation of the optical pulses, and matching the wavelength of the seed signal to a cavity length of the optical device based on the feedback signal.

The illustrated embodiment further comprises the step of operating an optical shutter, wherein the shutter is only opened when a stable seeding is achieved, and is closed whenever a rise in the feedback signal is observed indicative of a rise in the RF modulation.

In an embodiment the step of generating the feedback signal from the output of the optical device comprises the steps of detecting signals associated with an envelope of optical pulses produced by the optical device, and matching the wavelength of the seed signal to a cavity length of the optical device based on the detected signals.

The illustrated embodiment further comprises the step of pumping a single longitudinal mode (SLM) optical parametric oscillator (OPO) using the optical device.

An embodiment further comprises the step of adjusting a cavity length of the optical device.

The illustrated embodiments also include apparatus for operating according to any one or combination of the foregoing embodiments of the illustrated methods.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1a is a block diagram of a prior art free running design. FIG. 1b is a block diagram of a prior art seeded design. FIG. 1c is a block diagram of the layout used in the illustrated embodiment of the invention.

FIG. 3 is a block diagram of the layout of the seed-laser with optics to suppress reverse radiation from the host laser.

FIG. 4 is a functional block diagram of the electronic circuit used for the initial proof of concept for generating the feedback signal.

FIG. 14a is a photograph of the burn marks of the output beam of the laser of FIG. 13 (back burn).

FIG. 14b is a photograph of the vertically polarized component of this beam, which is rejected by the polarizer P2.

FIG. 14c is a photograph of a burn mark of the radiation passing through the aperture placed behind polarizer P2. The aperture is optimized to only transmit a 1.5 mm diameter central area of this beam.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Consider the seeding of small-frame Nd:Yag lasers. Seeding techniques in accordance with embodiments of the present invention are applicable to small, relatively inexpensive Q-switched Nd:YAG lasers. Introducing the seed beam via a polarizer into the laser cavity of a small Q-switched Nd:YAG lasers is limited by space constraints. Also, modifying the driver electronics of the Q-switch, to reduce its speed, is not desirable.

Figure 1A:
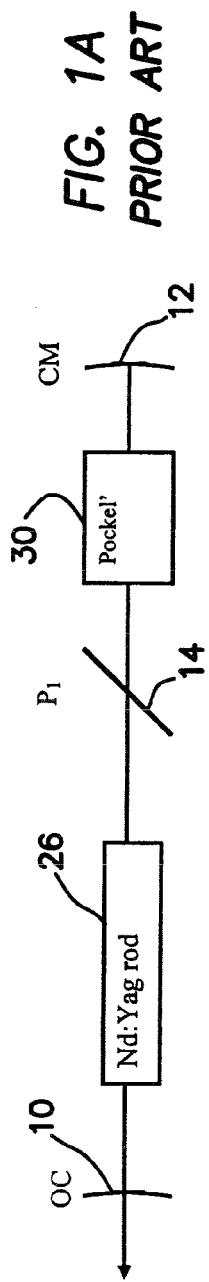
FIGS. 1a-1c are block diagrams of the general layout of two prior art nano-second Nd:YAG lasers and the illustrated embodiment of the nano-second Nd:YAG laser of the invention.
Figure 1B:
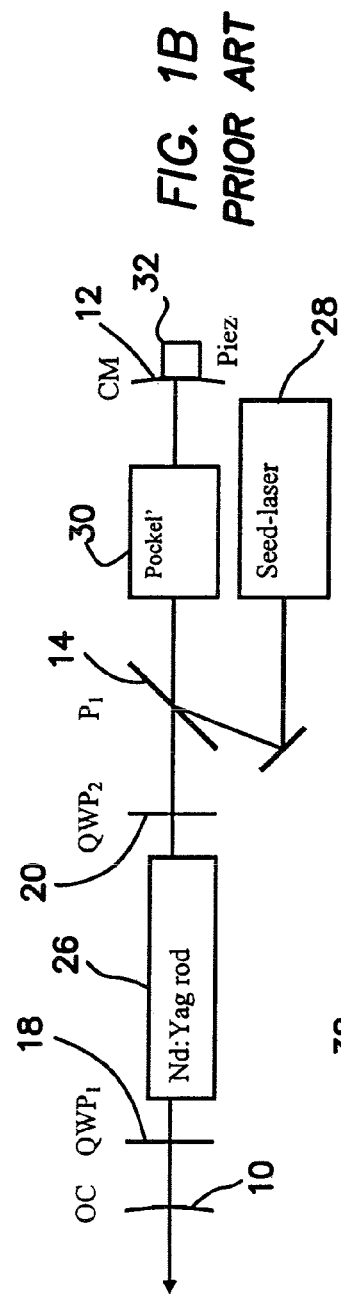
Figure 1C:
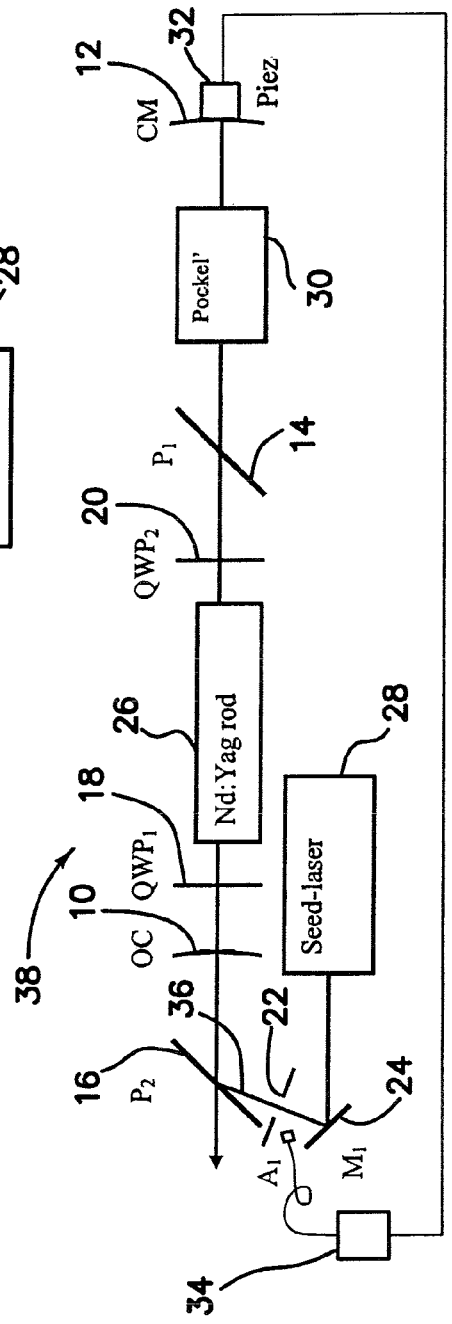

Instead, in the illustrated embodiment the seed-beam is introduced into the cavity via a polarizer mounted directly in front of the laser as shown in FIG. 1c. In FIGS. 1a-1c the element OC 10 is an output coupler or Gaussian dot mirror. CM 12 is a cavity mirror. In seeded lasers the cavity length is adjusted with a piezo-electric element 32 coupled to cavity mirror 12. $P_1$ 14 and $P_2$ 16 are thin film polarizers. $QWP_1$ 18 and $QWP_2$ 20 are quarter-wave plates. $A_1$ 22 is an aperture made in a Teflon® sheet material which in the illustrated embodiment has a diameter of 2.5 mm. $M_1$ 24 is a dielectric mirror. Each laser in FIGS. 1a-1c includes a Nd: Yag rod 26 and a Pockel's cell 30. The embodiments of FIGS. 1b and 1c also include a seed laser 28.

The disclosed feedback system uses the observation of modulation of the intensity of the produced optical pulse. When the laser is seeded, and the light pulse is observed with a photo detector 34, only relatively low frequency signals are generated, which are associated with the envelope of the pulse. For an 8-ns pulse, these signals typically lie below 125 MHz. When the laser is not seeded, a large number of longitudinal modes are produced, and the beating between these modes is observed as a modulation on the intensity of the laser pulse. For lasers with a cavity shorter than 0.5 meter, these beat signals have a frequency of more than 300 MHz. Using a suitable electronic filter, these two components of the detected intensity profile can be separated, and used to generate independent signals for the pulse intensity and an RF signal. The feedback mechanism for matching the cavity length to the seed minimizes the RF modulation of the generated pulse.

In FIG. 1c, coupling the seed-beam 36 in through the exit port of the host laser, generally denoted by reference numeral 38, and the RF detection technique, eliminate the need for the two major modifications to the host laser 38. However, it is still necessary to mount quarter-wave plates 18, 20 on either side of the gain medium or rod 26 and to mount one of the cavity mirrors, e.g. mirror 12, on a piezo-electric element 32. In most commercial laser systems these modifications are relatively easy.

Turning now to the host laser 38. For the experiments in the illustrated embodiment, a commercial small frame Nd:YAG laser (Ekspia NL302) is modified. The frame of this laser is an elongated aluminum box. The cavity mirror 12 and the output coupler 10 are placed on the far ends of the box, while the Pockel's cell 30, the polarizer 14, and the lamp-pumped Nd:YAG amplifier or rod 26 are placed inside the box. The rear or cavity mirror 12 is placed on a piezo-electric element 32. The movement of the actuator 32 is specified as 15 μm at a drive voltage of 1 kV.

A thin film polarizer $P_2$ 16 was placed in front of the laser 38 to direct the seed-beam 36 into the laser cavity. Brackets mounted onto the frame, holding the quarter wave plates 18, 20 were placed on either side of the Nd:Yag amplifier or rod 26. The wave plates were aligned using the beam of the seed-laser. A mirror was placed behind the front quarter wave plate $QWP_1$ 18. Observing the reflected beam via the polarizer $P_2$ 16, the wave plate 18 is rotated to minimize the reflection with the same polarization as the incident seed-beam 36. Next, $QWP_2$ 20 is placed in the cavity, and the orientation is adjusted for minimum transmission of the seed-beam 36 through the polarizer, $P_1$ 16 inside the cavity. In accordance with some embodiments of the invention, introducing the waveplates 18, 20 into the cavity changes the polarization of the nano-second pulses generated from vertical to horizontal. In accordance with some other embodiments of the invention, any plane of polarization can be equivalently chosen.

Figure 2:
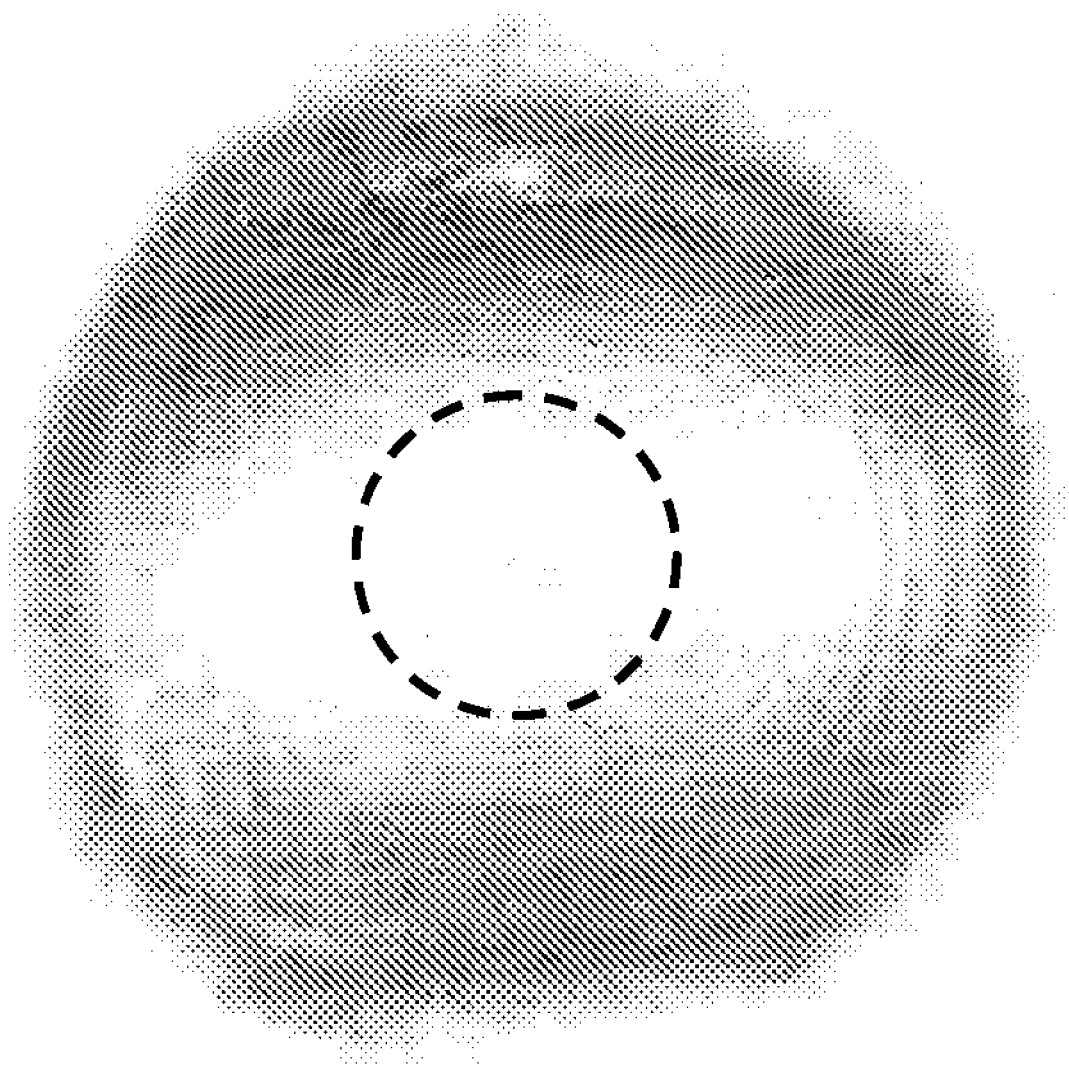
FIG. 2 is a photograph of a burn profile of the beam from Nd:Yag laser rejected by polarizer $P_2$ of FIG. 1c in front of aperture $A_1$. The outer diameter of this ring is 8 mm. The aperture removes the ring, while the seed-light enters through a 2.5 mm hole in the center (dotted circle).

When the laser 38 is fired, the generated beam is not perfectly linearly polarized. A perpendicular component is present due to depolarization effects in the Nd:YAG rod 26 caused by thermal strain. The temperature gradient is largest close to the side surface of the rod 26, causing the beam rejected by $P_2$ 16 to look like a ring as shown in the photograph of FIG. 2. An aperture 22 with a diameter of 2.5 mm in a Teflon® sheet was placed behind $P_2$ 16 to reject this ring while allowing the introduction of the seed-beam 36. A small part of the light scattered from the aperture 22 is coupled into an optical fiber and used for the feedback mechanism, which locks the cavity length to the seed-laser 28.

Turning now to consider the seed laser 28 in greater detail. An Nd:YVO$_4$ (Vanadate) single longitudinal mode micro chip laser 40 obtained from Elforlight, UK is used as the seed-source in laser 28 as diagrammatically shown in the block diagram of FIG. 3. The optical isolator 42 is 2BIG-1064 (Electro Optics Technology Inc.). P$_3$ 44 and P$_4$ 48 are Calcite Glenn-Taylor Polarizers. The Faraday rotator 46 is 2BIG-1064 ROT (Electro Optics Technology Inc.). Lenses L$_1$ (f=–100 mm) 50 and L$_2$ (f=150 mm) 52 form a telescope. Behind the telescope the beam diameter is 1.0 mm (1/e). Most of the optics are not Ar coated, causing a substantial loss of power. The power levels at the numbered positions in FIG. 3 are: 1) 57 mW, 2) 40 mW, 3) 33 mW, 4) 27 mW, 5) 20 mW and 6) 18 mW.

The wavelength of this laser 40 is adjusted via the temperature of the chip, which modifies the optical length of the cavity. Using a 1-meter Chromatix spectrometer, mounted with a Pixelink CMOS camera, the wavelength is set to the center of the spectral profile of the free-running Nd:Yag laser 38. Single-mode operation of the laser 40 is assured using a 1.5-GHz Fabry-Perot interferometer. Although the CW laser 40 is rated for 100 mW, the output power is reduced to 57 mW. At higher power levels a parasitic mode appears at about 2.5 GHz from the main mode. The beam produced by the laser 40 is vertically polarized.

The beam 36 is led through a small (7 mm long, 7 mm outer diameter) optical isolator 42. The optically-active material is bismuth iron garnet (BIG), and the polarizers in isolator 42 are made of Polarcor, a trademark of Corning. The extinction level of this isolator 42 is about 37 dB. Next, the beam is brought into a second isolator 46 comprised of a Faraday rotator similar to the one used in the first isolator 42, with two calcite Glenn-Taylor polarizers, P$_3$ 44 and P$_4$48, one on either side. The Faraday rotator 46 is oriented such that it compensates for the rotation of the polarization of the first isolator 42. The orientation of the polarizers 44, 48 is adjusted for optimal isolation and maximum transmission of the seed-beam 36, while minimizing the counter-propagating beam.

In this embodiment, two polarizers P$_3$ 44 and a Polarcor polarizer inside the first optical isolator 42 are included. In principle, this Polarcor polarizer is not necessary and could be removed. This would however put very stringent requirements on the alignment of the overall system. The diameter of the beam transmitted by the isolators 42 and 46 is adjusted to 1 mm and collimated using two lenses, L$_1$ 50 and L$_2$ 52 with focal lengths +150 mm and –100 mm, respectively. The beam 36 is directed via mirror M$_1$ 24, aperture A$_1$ 22 and polarizer P$_2$ 16 into the host laser 38.

Turning now to the generation of the feedback signal. An RF demodulation technique in accordance with embodiments of the invention is developed to obtain a feedback signal to adjust the cavity length. This ensures that one cavity mode of the host laser 38 remains resonant with the seed-wave 36. Advantageously, the speed of the driver of the Pockel's cell 30 does not need to be reduced, resulting in less loss of output power, shorter output pulses, and smaller jitter.

Using systems in accordance with embodiments of the invention, scattered light of the fundamental wave is observed using a seeded Continuum PowerLite 8000, Nd:Yag laser 38, with either the seed laser 28 on or off. The high-frequency component of the signal is detected with a circuit shown in the block diagram of FIG. 4.

In the circuit of FIG. 4, the fiber coupler 54 is a Thorlabs F220FC-C. The photo diode detector 34 is a silicon-based Thorlabs SV2, with a 2-GHz bandwidth. The bias T's 58 and 66 are Mini-Circuits ZFBT-4R2G (10-4200 MHz). The filter 60 is one or more of Mini Circuits SHP 250, SHP 400 or SHP 700 with cut-off frequency f$_{co}$. 205, 360 and 640 MHz respectively. The amplifier 62 is a Pasternack PE1510 (18 dB, 500-2000 MHz). The Schottky-diode detector 68 is a Pasternack PE8010 (10-2000 MHz, 500 mV/mW).

The scattered light is picked up by the fiber coupler 54 and led into the detector 34. The detector 34 is terminated at 50 ohms via a bias tee 56. The high-frequency component of the photo diode signal is passed through a high-pass filter 60. Three different types of filters are used for filter 60, namely Mini Circuits SHP 250, SHP 400 and SHP 700 with cut-off frequencies (f$_{co}$) of 205, 360 and 640 MHz, respectively. The signal is then amplified by 18 dB using a broadband RF amplifier 62. The power for the amplifier is provided via the second bias tee 66. The amplified signal is demodulated with a 2-GHz Schottky-diode detector 68 and recorded with an oscilloscope 70.

Figure 5:
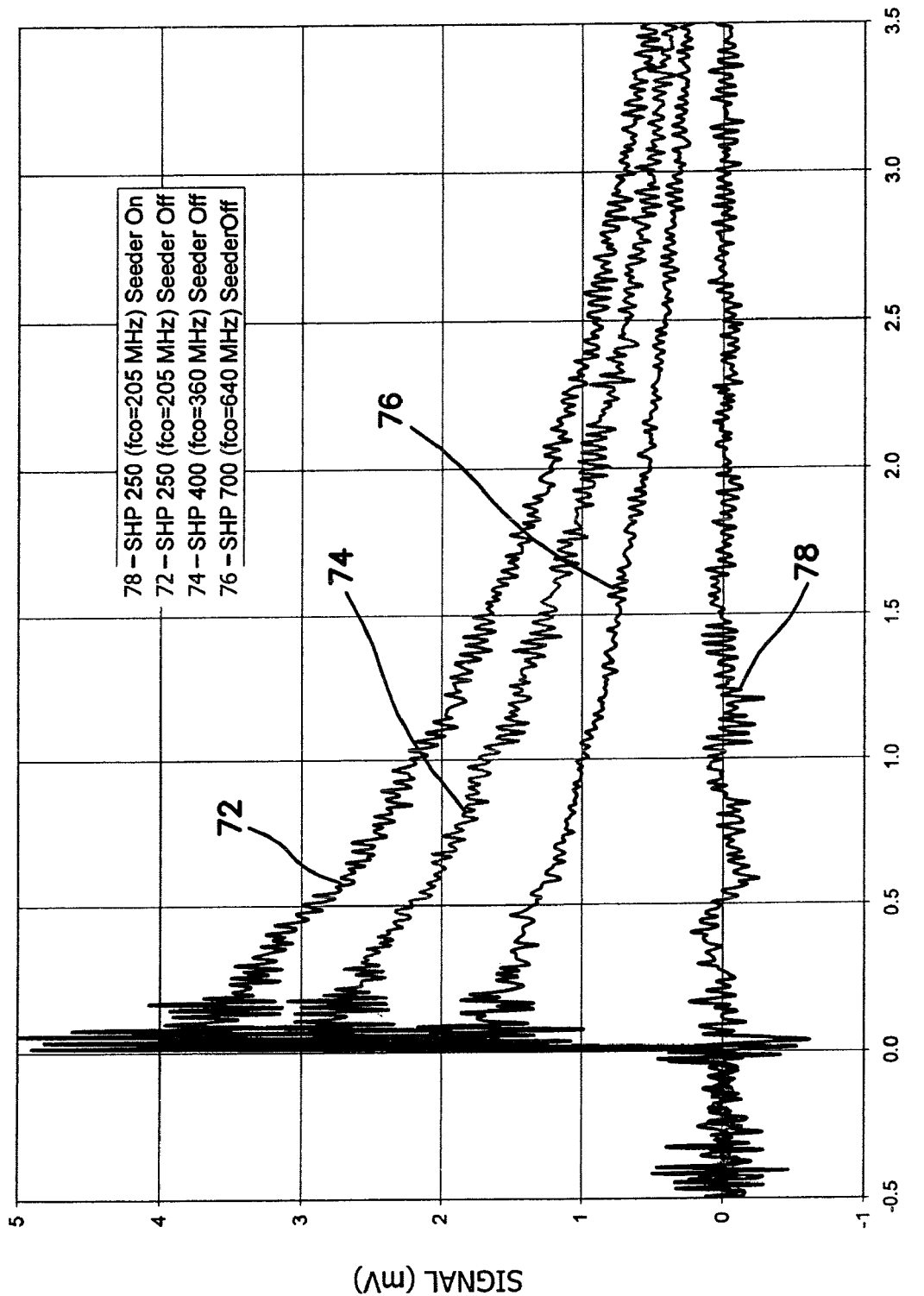
FIG. 5 is a graph of the signals obtained with the initial RF demodulation circuit of FIG. 4 and a Continuum Powerlite 8000 laser taken with different filters.

The output signals, as shown in the graph of FIG. 5, clearly demonstrate the viability of this detection concept. In FIG. 5, the signals, in units of mV, are graphed as functions of time in ps. Three filters obtained from Mini Circuits are used: SHP 250 (f$_{co}$=205 MHz), SHP 400 (f$_{co}$=360 MHz) and SHP 700 (f$_{co}$=640 MHz). The mode spacing in this laser is 288 MHz, and the pulse duration ~8 ns. The filter with a cut-off frequency of 205 MHz is sufficient to separate the RF component. Filters with higher cut-off frequencies result in a loss of signals. When the seed laser is on, identical signals are observed for all filters.

The upper two curves 72 and 74 are the signals when filters SHP 250 and SHP 400 respectively are used when the seed laser is off, and the lower two curves 76 and 78 represent the signals when filters SHP 700 and SHP 250 were used respectively when the seed laser is on. When seeded, the detected RF signal practically disappears; the RF signal becomes strong when the laser is not seeded.

The cavity of the Continuum PowerLite laser 38 is relatively large (52 cm). The beating frequency (f=c/2l, where c is the speed of light, l is the length of the cavity) is relatively small (288 MHz). Thus, it is important to choose a filter 60 with a cut off frequency f$_{co}$ below this beating frequency to detect the beating between adjacent cavity modes, but sufficiently high to reject the envelope of the pulse. As can be seen form the measurements of FIG. 5, using the filter 60 with a cut-off frequency of 205 MHz results in the largest detected signal while completely rejecting the pulse envelope. In embodiments of the invention, a laser 38 with cavity length of 38 cm is used, where the lowest beat frequency is 394 MHz, and a filter 60 with f$_{co}$ 360 MHz is chosen.

Turning now to a more detailed consideration of the detector circuit. To integrate this detection scheme with the laser 38, an electronic circuit is designed and assembled on a 10 by 8 cm board using SMD components in accordance with embodiments of the invention, shown in the schematic in FIG. 6.

The optical signal is detected with a fast InGaAs-based photo diode 34 (EPM745). The high-frequency part is separated using the filter 60, PHP400, amplified (Gali 3) and detected (LTC 5501-1). The resulting signal is then amplified again by amplifier 85 (½ LMH6626), and directed via a delay line 79 into the sample-and-hold circuit 81 (½ OPA 2227, ¼ MAX4521, ½ LMC6482). The low frequency part of the detected signal is recovered using a trans-impedance amplifier 74 (½ LMH6626), and directed into an identical delay-line and sample-and-hold circuit 76. The comparator 91 (LM311) and monostable multivibrator 93 (74VHC123) provide the timing signals, GATE, for the sample-and-hold circuits. It is to be understood throughout the specification that designation of components and the design in the schematics are by way of example only and do not constitute a limitation of the scope of the invention.

Figure 6:
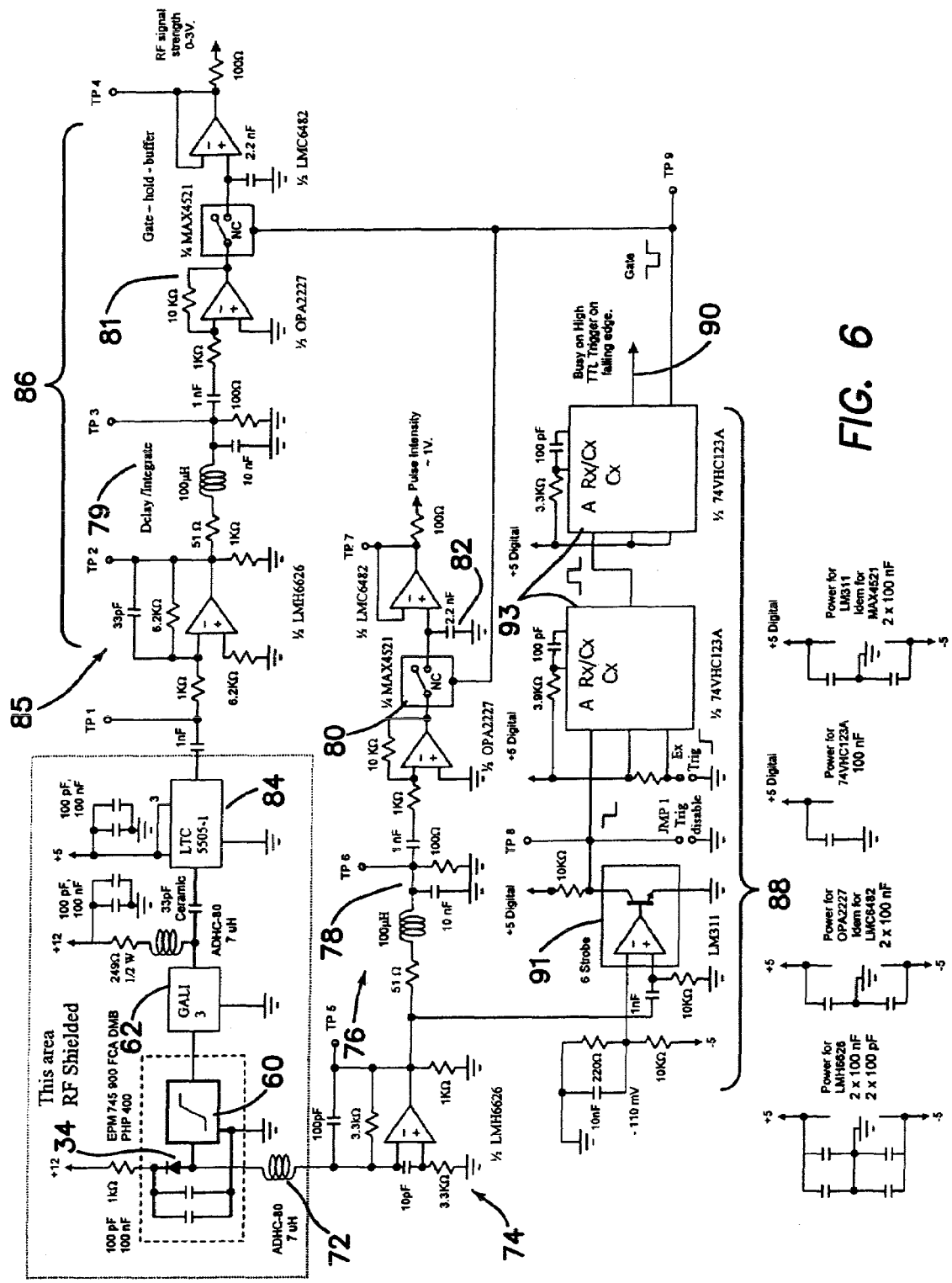
FIG. 6 is a detailed schematic of the circuit designed to detect the pulse intensity and RF signals of the laser pulse.

For the illustrated of the embodiment of the circuit in FIG. 6, a high speed, fiber coupled, InGaAs photo diode 34 with a bandwidth of 3.0 GHz is used. The photo diode 34 is mounted close to the high pass filter 60 to detect the RF component. The low-frequency part of the signal is fed via a choke 72 into a trans-impedance amplifier 74. The resulting signal is then used to trigger the sample-and-hold electronics 76. The pulse signal is also led via a delay line 78, into an analog switch 80 with a hold capacitor 82, which acts as the sample-and-hold circuit 76. The timing of the switch coincides with the moment the pulse from the delay line 78 reaches its maximum amplitude.

The RF component of the signal is amplified with a broadband amplifier 62 (Gali 3 from Mini Circuits), and detected with an RF power detector 84 with a buffered output (LTC 5505-1). The resulting signal is then amplified and led into a sample-and-hold circuit 86, similar to the sample-and-hold circuit 76 used for holding the pulse signal. The timing circuit 88 also generates a "busy" signal 90, which is used to trigger the data acquisition to read in the RF and the pulse intensity signals.

Figure 7:
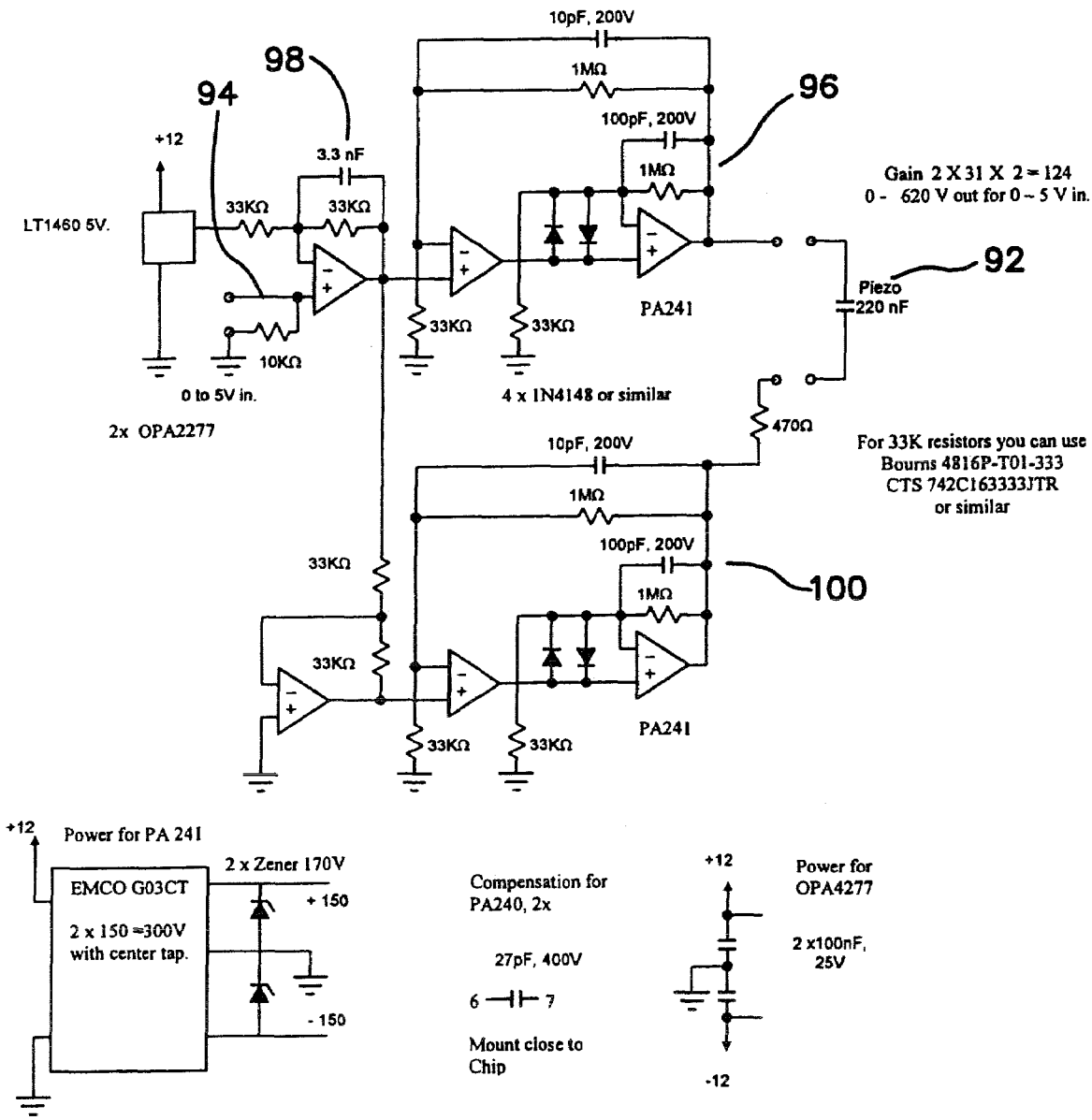
FIG. 7 is a detailed schematic of a high voltage driver circuit for the piezo-electric element.

Turning now to consider the piezo-electric element 92 shown in the block diagram in FIG. 7. The voltage to the piezo-electric element 92 is generated using a high-voltage amplifier 96, which in turn is driven from a small analog voltage. The input voltage 94, between 0 and 5 V, is translated into a voltage between −5 V and +5 V using a level converter circuit 98 (½ OPA2277). The resulting voltage is then amplified by a factor 31 using a high-voltage op-amp circuit 96 (PA241 and ½ OPA2277). The steer voltage is also inverted (½ OPA2277), and is amplified using a second high voltage amplifier 100, resulting in two high voltage outputs with opposite polarity. The piezo-electric element 92 is connected to these outputs, such that the voltage over the piezo swings over twice the total supply voltage, in this case 600V. The total voltage swing over the piezo-electric element 92 is 600V, resulting in an approximately 9-μm for this driver.

Turning now to the locking mechanism. In accordance with embodiments of the invention, the feedback to lock a mode of the host cavity to the wavelength of the seed-laser 28 is generated using a LabView program. The analog signals are sent to a DAQPad-6020E (National Instruments) interface (not shown). The data acquisition is hardware-triggered by the failing edge of the "busy" signal 90. Similarly, the analog signal 94, which controls the position of the piezo-electric element 92, is generated using a second NI DAQPad-6020E unit (not shown).

The LabView program can be run in two modes: sawtooth generation, or locking. In the sawtooth mode, the position of the piezo-electric element 92 is linearly scanned, and at the end of the scan the piezo-electric element 92 is gently brought back to its start position. In the lock mode, the piezo-electric element 92 is dithered, and the ratio of the RF and the pulse signals is recorded. From the difference between the dither-up and dither-down signals, a correction of the average voltage sent to the piezo-driver described in FIG. 7 is calculated.

Figure 8:
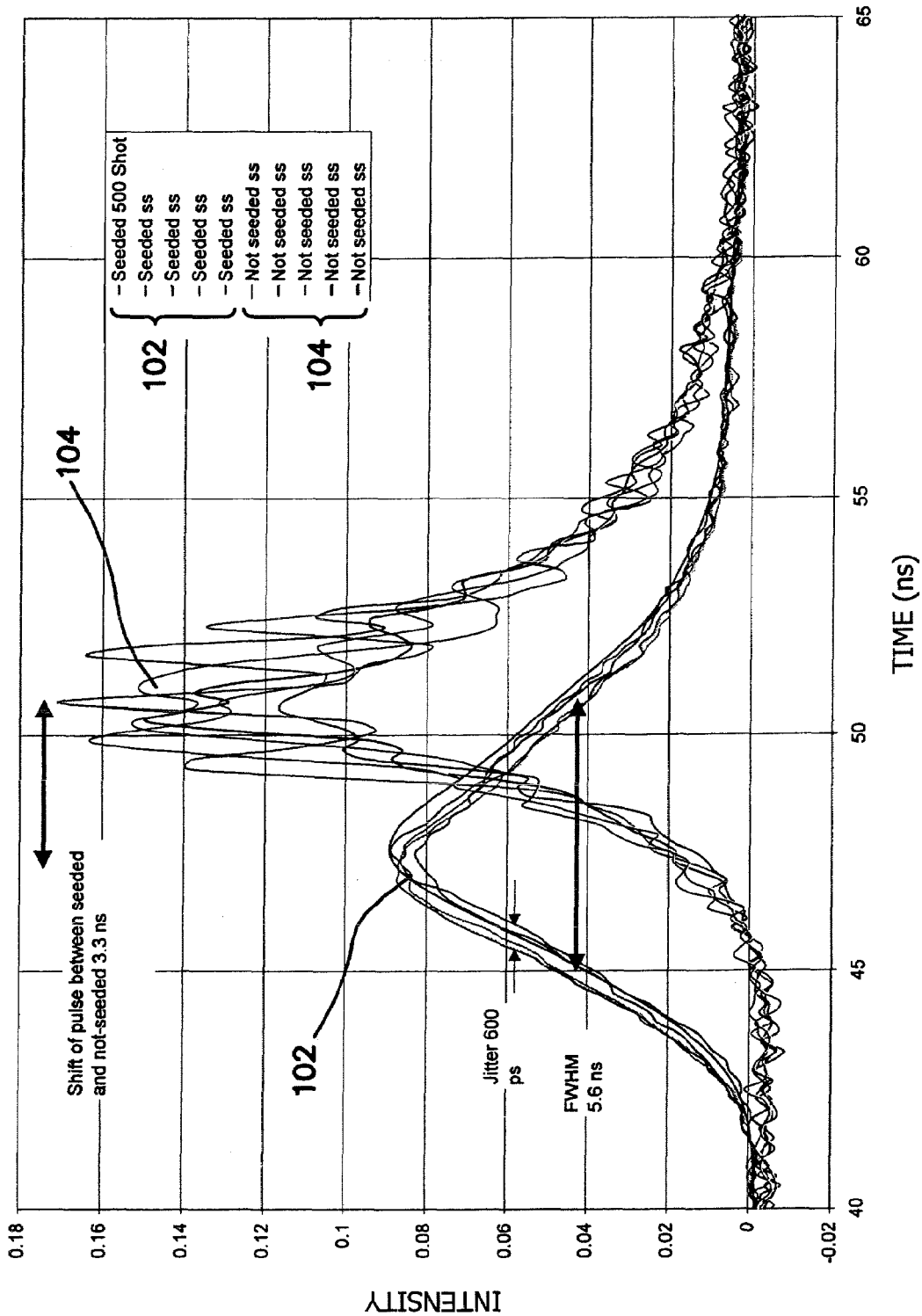
FIG. 8 is a graph of the temporal profile of the laser pulses, recorded with a 2 GHz photo diode and a Tektronix TDS680C), GHz oscilloscope. When seeded the pulses are smooth and show <1 ns jitter. When not seeded the cavity build-up time is 33 ns longer and the pulses show strong modulation due to beating between the cavity modes.

Considering now the operation of the illustrated embodiments and their results. The laser system 38 and seeder system 28 are assembled on a sufficiently stable optical breadboard. The temporal profile of the generated pulses is recorded using a high-speed silicon photodiode (Thorlabs SV2) and a 1 GHz Oscilloscope (Tektronix TDS 680C). The oscilloscope is triggered from the same TTL signal that also fires the Pockel's cell 30 in the host laser 38. The results are shown in the graph of FIG. 8, where the intensity of the signal is shown as a function of time.

Figure 9:
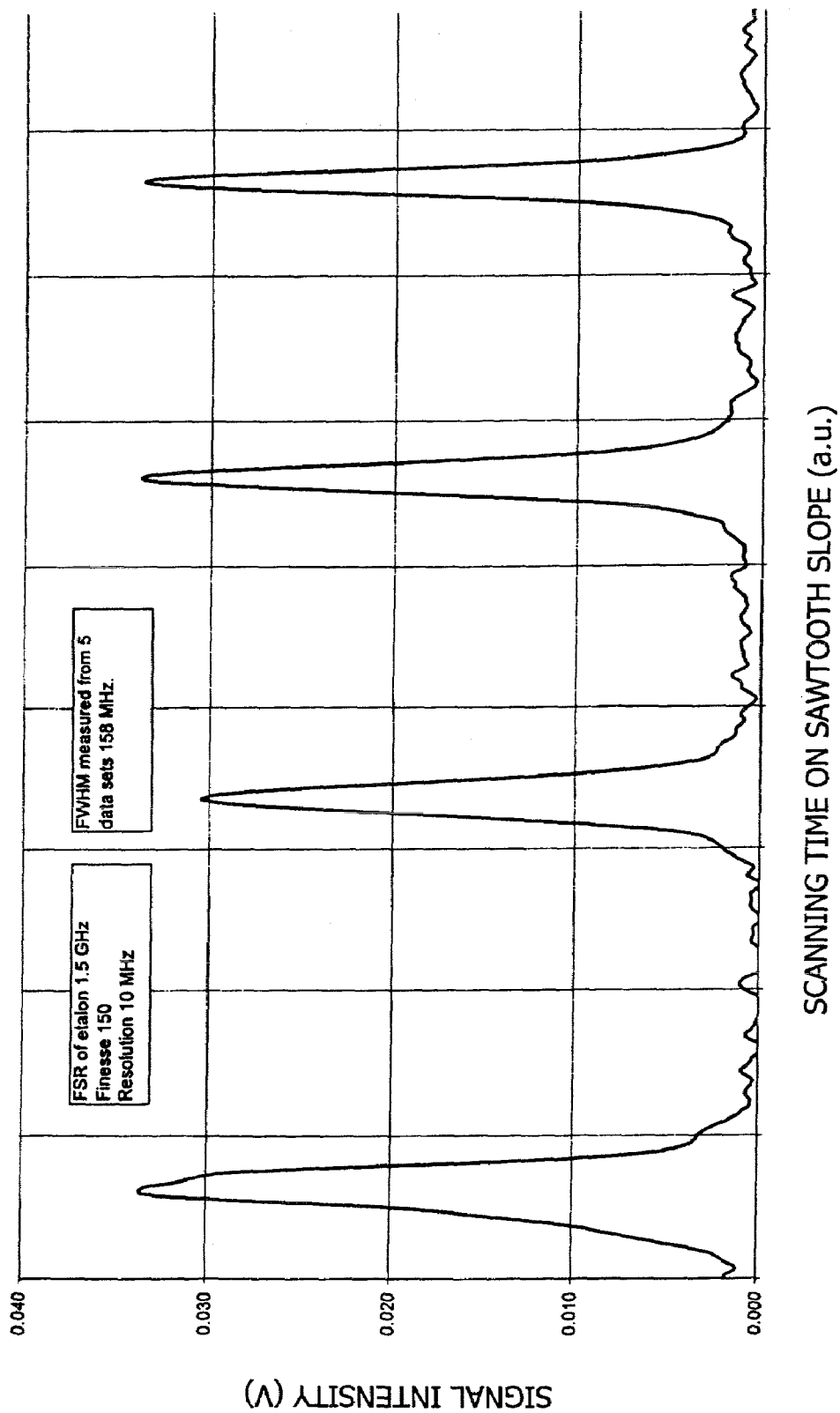
FIG. 9 is a graph of the fringe pattern of the seeded nano-second laser (1064 nm), with a Fabry-Perot scanning etalon. The free spectral range of the etalon is 1.5 GHz, Finesse 150 (10 MHz resolution). The observed bandwidth is 158 MHz. The pulse duration is 5.6 ns (See FIG. 7). The Fourier product $\Delta\nu\Delta t$ is $158 \cdot 10^6 \times 5.6 \cdot 10^{-9} = 0.88$.

As shown, smooth optical pulses 102 with duration of 5.6 ns, measured with a Full Width at Half Maximum (FWHM), are produced when the laser 38 is seeded. When the laser 38 is free running, the laser pulse 104 is delayed by 3.3 ns, and shows strong modulation artifacts due to the beating between the cavity modes. The spectra of both the seeded and the free-running laser are observed using a 1 meter Chromatix spectrometer. The image plane of the spectrometer is re-imaged with a 4× microscope objective onto a Pixelink PL-A661 CMOS camera with its infra-red absorption filter removed. The image is converted into a spectrum by vertical binning. The recorded spectra are shown in the graph of FIG. 9, where the spectral narrowing of the seeded radiation is demonstrated.

To obtain a higher-resolution measurement of the spectral profile of the generated radiation, the bandwidth is measured with a Fabry-Perot interferometer. The finesse of the interferometer is 150, and the free spectral range is 1.5 GHz. Therefore, the resolution is 10 MHz, sufficient for the measurements described here.

Figure 10:
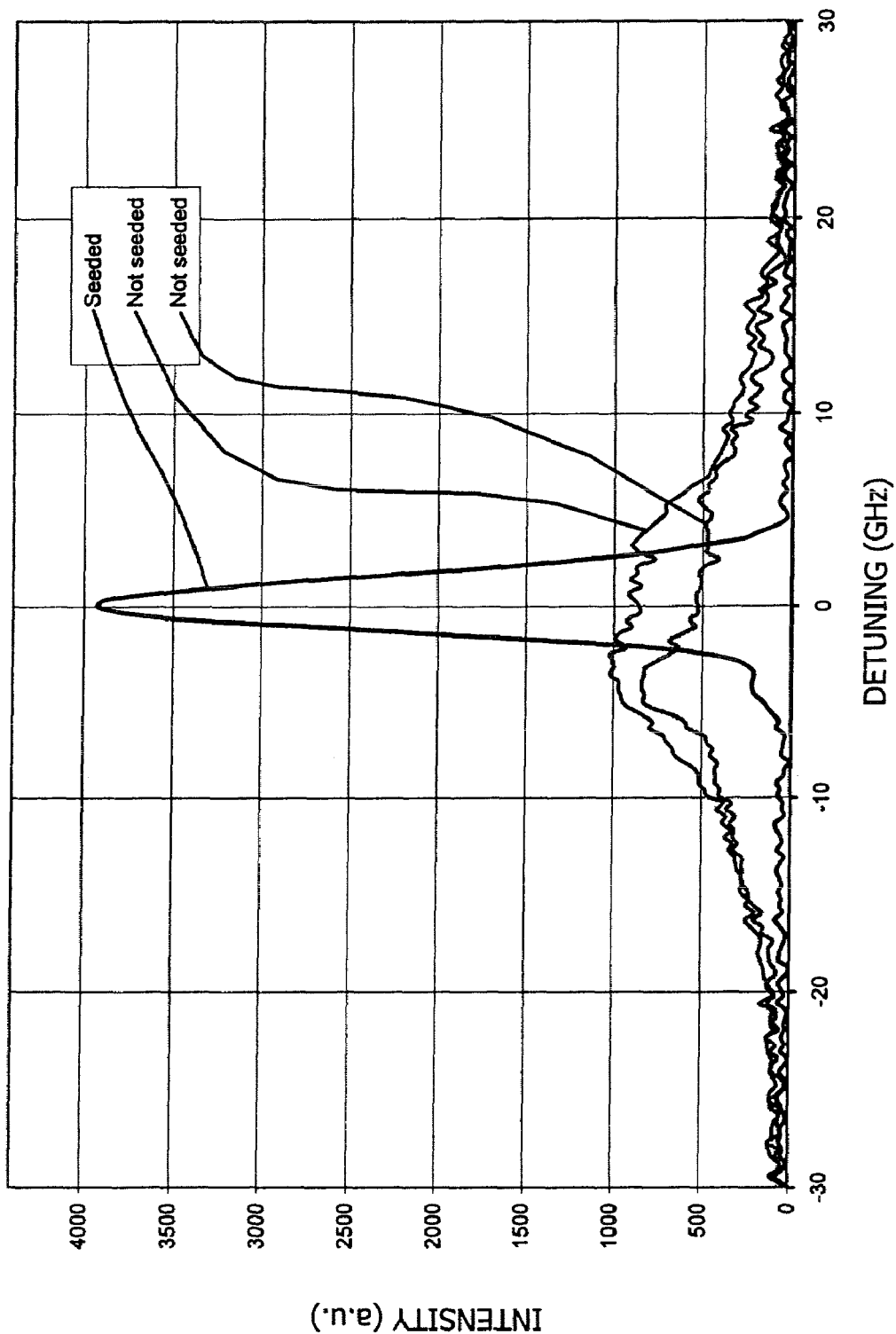
FIG. 10 is a graph of the spectrum of the seeded, free running Nd:Yag laser (2 recordings). A 1 m spectrometer was fitted with a Pixelink PL A661 camera. The exit slit was opened completely and imaged with a 4×microscope objective on the CMOS chip. In the free running mode a random, broad spectrum is generated. When seeded the spectral distribution clearly narrows.

A small fraction of the radiation from the seeded laser is passed through the interferometer and recorded. One of the measurements of the seeded and unseeded pulses is shown in the graph of FIG. 10. The average bandwidth obtained from five sets of measurements is 158 MHz. The laser 38 is also operated at a lower power level, by increasing the delay of the Q-switch from 225 ps (optimal) to 312 μs. In this case the pulse duration increases to 9.0 ns. The corresponding bandwidth is then 82 MHz.

Figure 11:
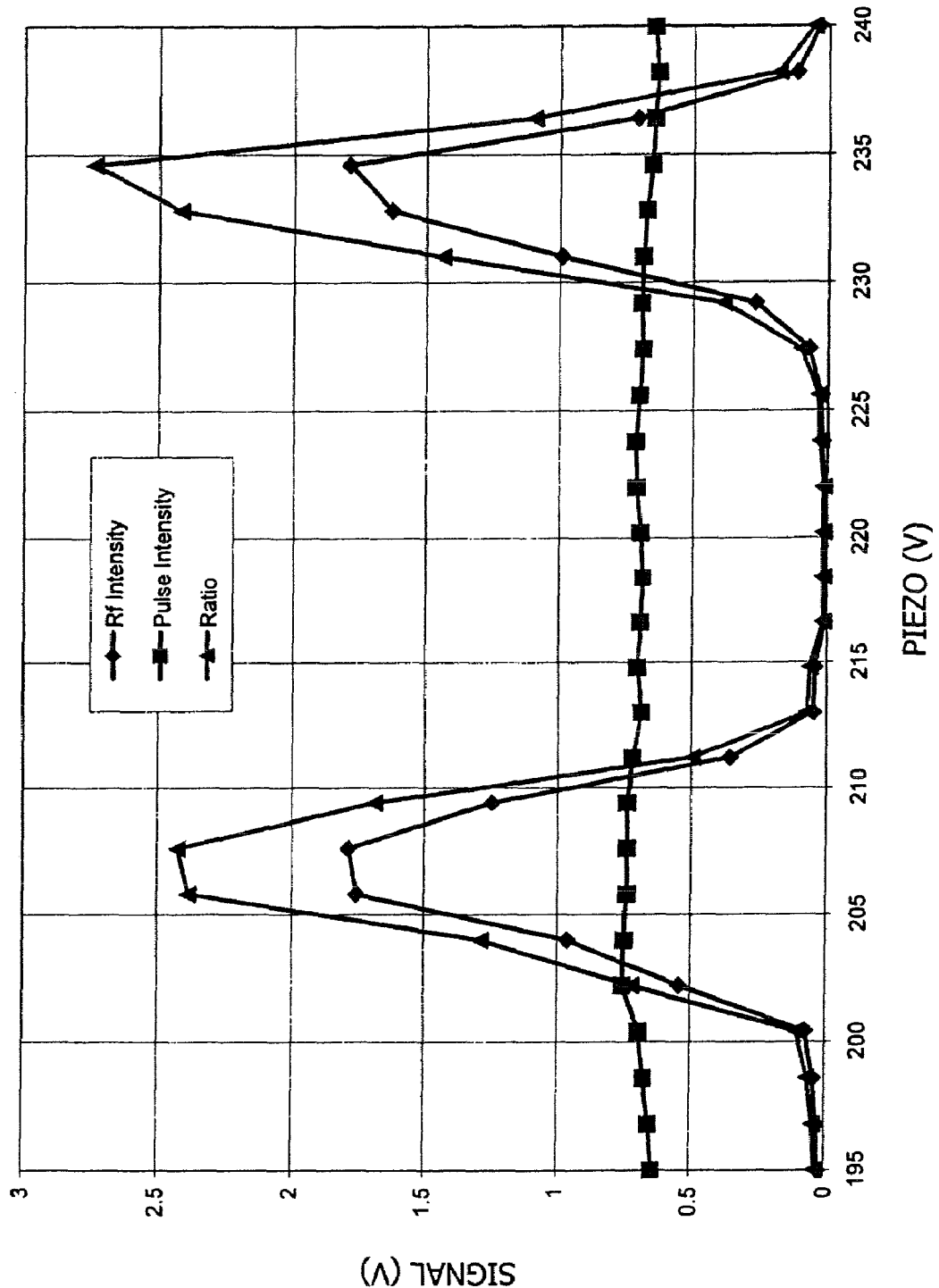
FIG. 11 is a graph of the feedback signals recorded when scanning the length of the optical cavity. The pulse intensity remains stable, while the RF modulation of the pulse shows strong modulation. In the feedback software the compensated signal; the RF intensity divided by the pulse intensity is used. The visibility of this signal is more than 170.

The quality of the generated feedback signal is observed by scanning the cavity length while recording the feedback signals. These are shown in the graph of FIG. 11, where the RF and pulse intensities are shown, together with their ratio, as functions of time. The resolution of the obtained signal is very good. The ratio between the minimum and maximum signals is more than 170. By observing this signal, the feed back loop attempts to maintain the laser cavity length adjusted to the minimum of this pattern, to correspond to the performance in the graph of FIG. 11. This would require about 220V applied to the piezo-electric element 92.

Figure 12:
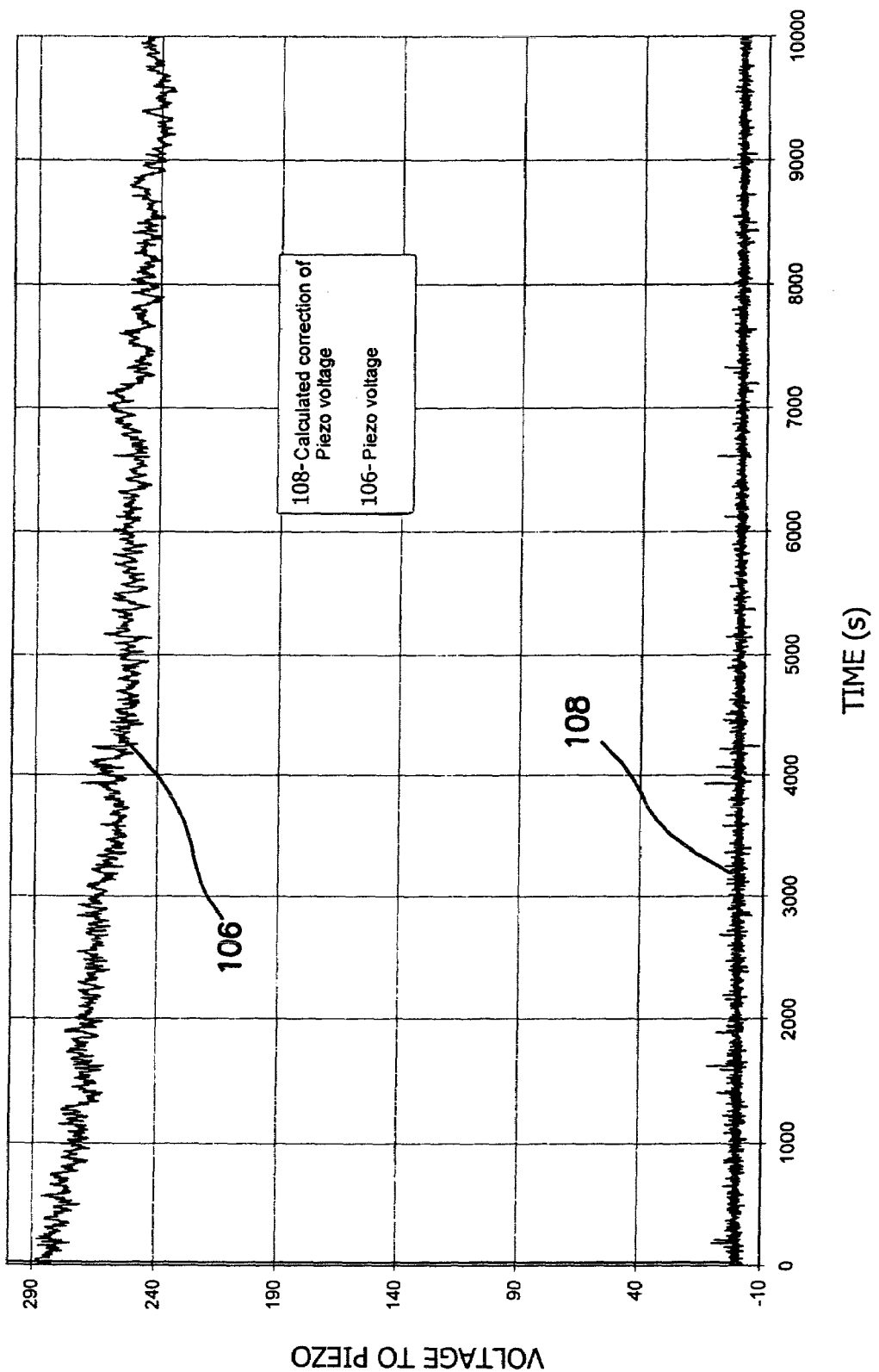
FIG. 12 is a graph of the voltage on the piezo-electric element and the correction of this voltage, shown for time span of almost three hours. On this graph t=0 is 30 minutes after making a cold start. It is expected that the seed-loop can remain stable for considerably longer times.

When the seeded laser system 38 is started from "cold", typically a 30 minute warm-up period is required. If the lock loop is started too soon, the temperature of the laser is still increasing and the cavity is expanding. In this case, the total movement of the piezo-electric element 92 is not sufficient to compensate for the expansion of the cavity, and the lock may be lost. Once warmed up, the laser 38 can be easily maintained locked as long as desired, typically a few hours. By observing the piezo signal 106 and the correction signal 108 over an extended period as depicted in the graph of FIG. 12, it is expected that this lock can be maintained for a considerably longer period.

Figure 13:
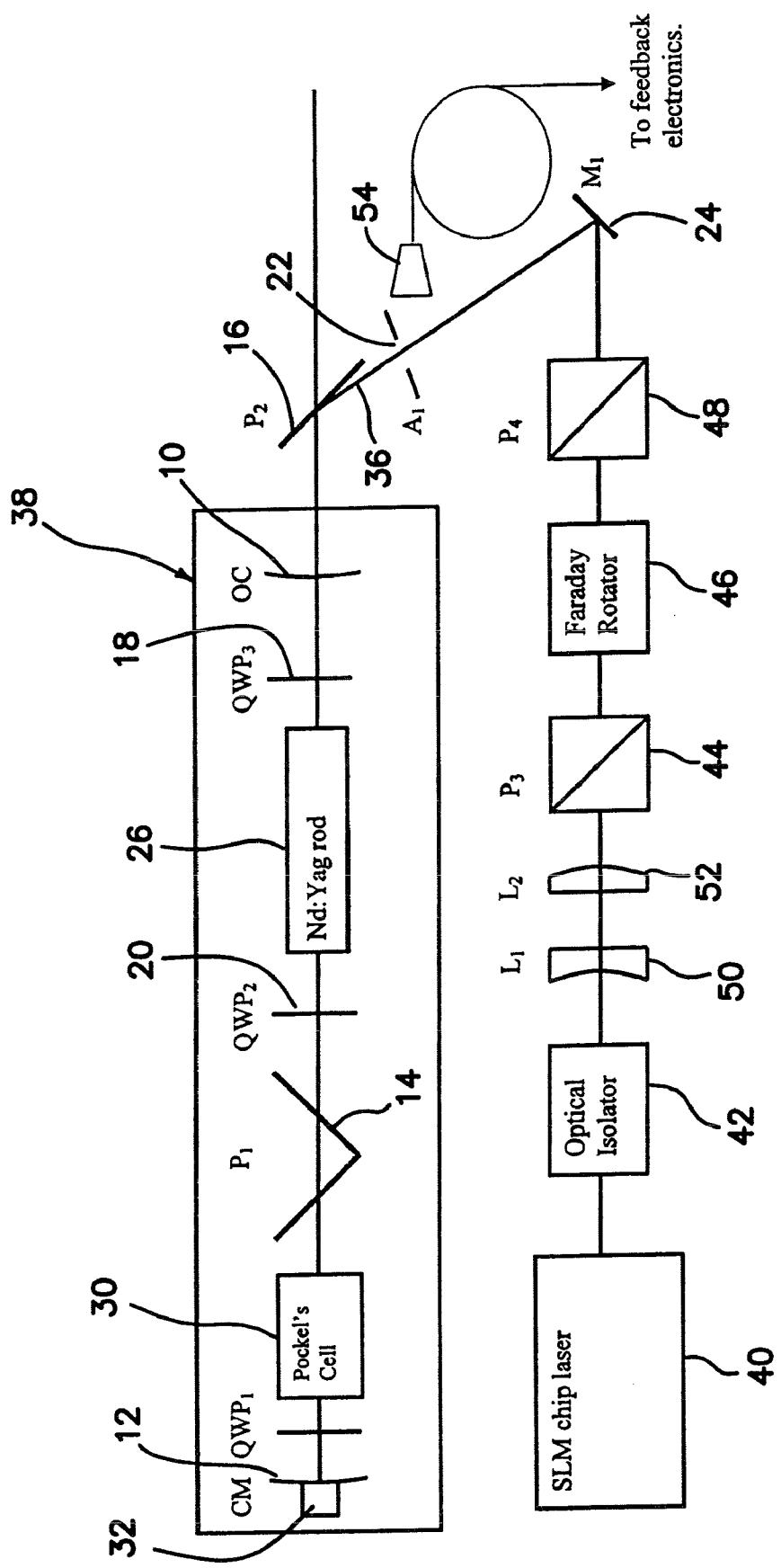
FIG. 13 is a block diagram of a seeded Brilliant A laser.

Similar to the apparatus and method described above, a Quantel Brilliant A laser 38 is seeded using the same principles as depicted in the block diagram of FIG. 13. The quarter wave plates QWP2 20 and QWP3 18 are added to the cavity. The cavity mirror CM 12 is mounted on a piezo-element. In this design, the polarizer P1 14 includes two consecutive thin film polarizers mounted in a "V" arrangement. The seed beam 36 is coupled in via P2 16. The SLM chip laser 40 is protected with two optical isolators 42, (EOT 2BIG1064 and P3 44, P4 46, placed around a Faraday rotator 46 obtained from Isowave). The beam expansion telescope 50, 52 of the seed laser 40 is placed between the isolators 42, 46, such that the pulsed radiation reaching the first polarizer 44 does not travel through any converging optical elements.

The rear mirror 12 is placed on a piezo-electric element 92 (PI Ceramics P-016.00H). The cavity is again fitted with two quarter-wave plates 18, 20, which are in this case mounted on the covers that provide access to the surface of the Nd:Yag rod 26 in the laser 38. The seed beam 36 is coupled into the laser via a polarizer $P_2$ 16 placed in front of the laser 38. The cavity of the laser 38 is aligned to make the depolarized fraction of the pulsed beam, which is rejected by this polarizer 16, more symmetric, as shown in the photographs of FIGS. 14a-14c. The laser 38 is again seeded, and a stable lock may be maintained as long as needed.

Figure 15:
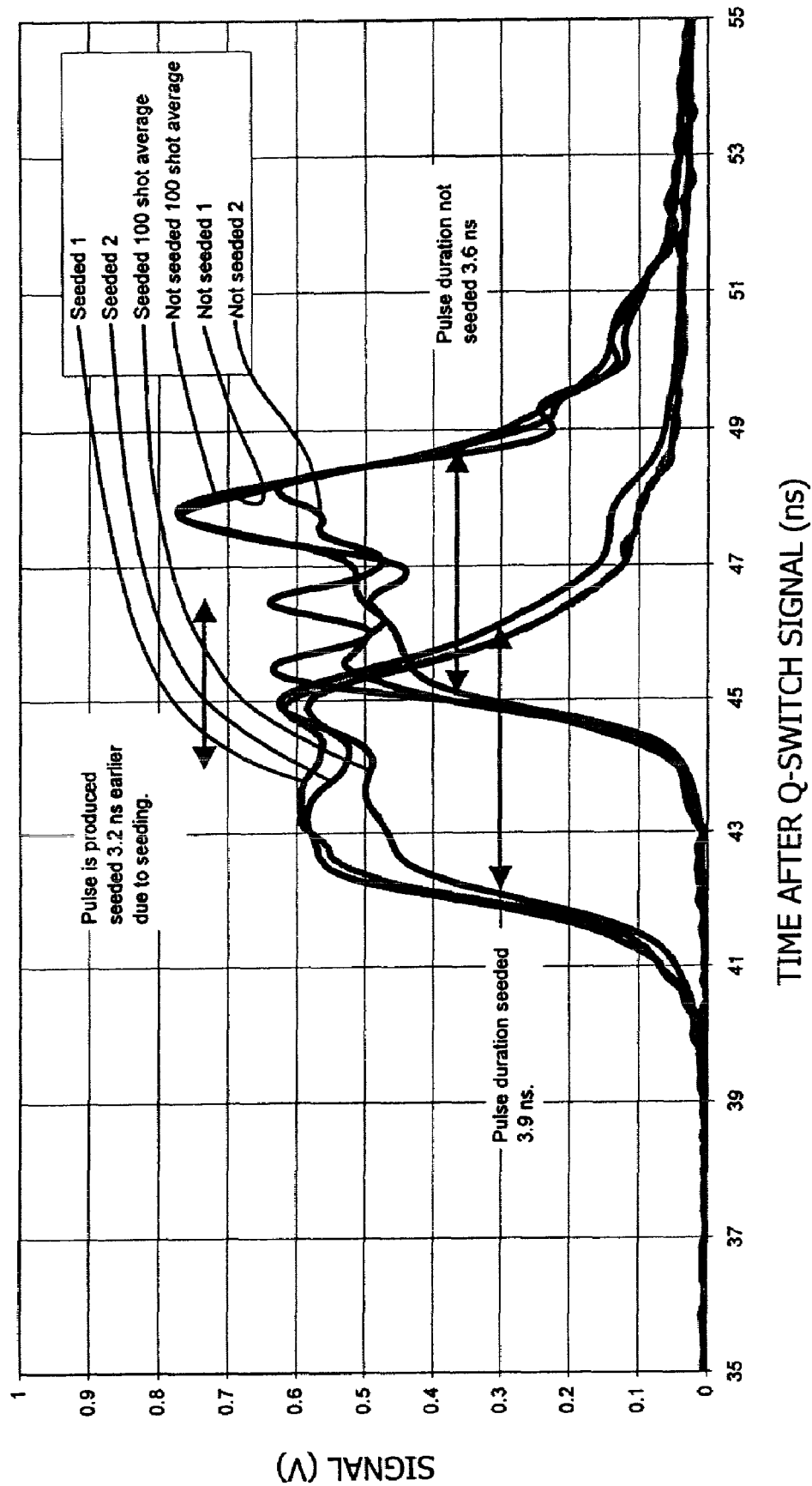
FIG. 15 is a graph of the temporal profile of the pulses produced at full power, seeded and unseeded. The pulses do show a "square" shape, while the shape of the unseeded pulses is modulated as well. The shift in timing between the seeded and un-seeded pulses is only 3.2 ns.
Figure 16:
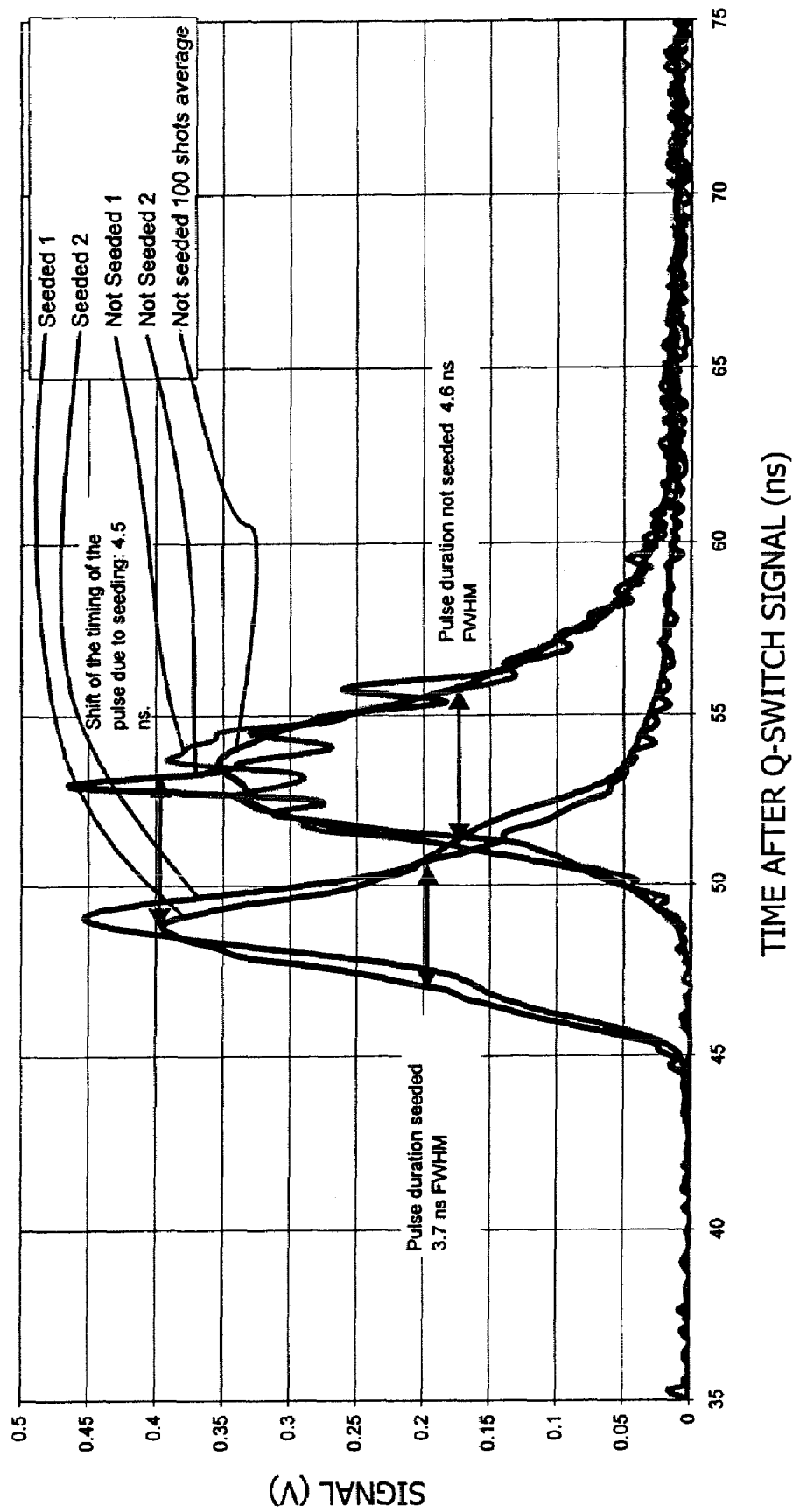
FIG. 16 is a graph similar to FIG. 15 except the gain in the laser was reduced by increasing the delay of the Q-switch to 250 μs. The pulsed show a more Gaussian shape, but the time-shift of the pulses due to seeding remains small at 4.5 ns.

As can be seen from the oscilloscope traces shown in the graphs of FIG. 15 and FIG. 16, seeding the laser 38 removes the modulation of the laser pulse. When the host laser 38 is seeded, the oscillation builds up faster, but the difference in timing is in the order of the duration of the laser pulse itself. It would be otherwise difficult to use this small timing effect for a stabilization mechanism, demonstrating the benefit of the stabilization technique described here.

Figure 17:
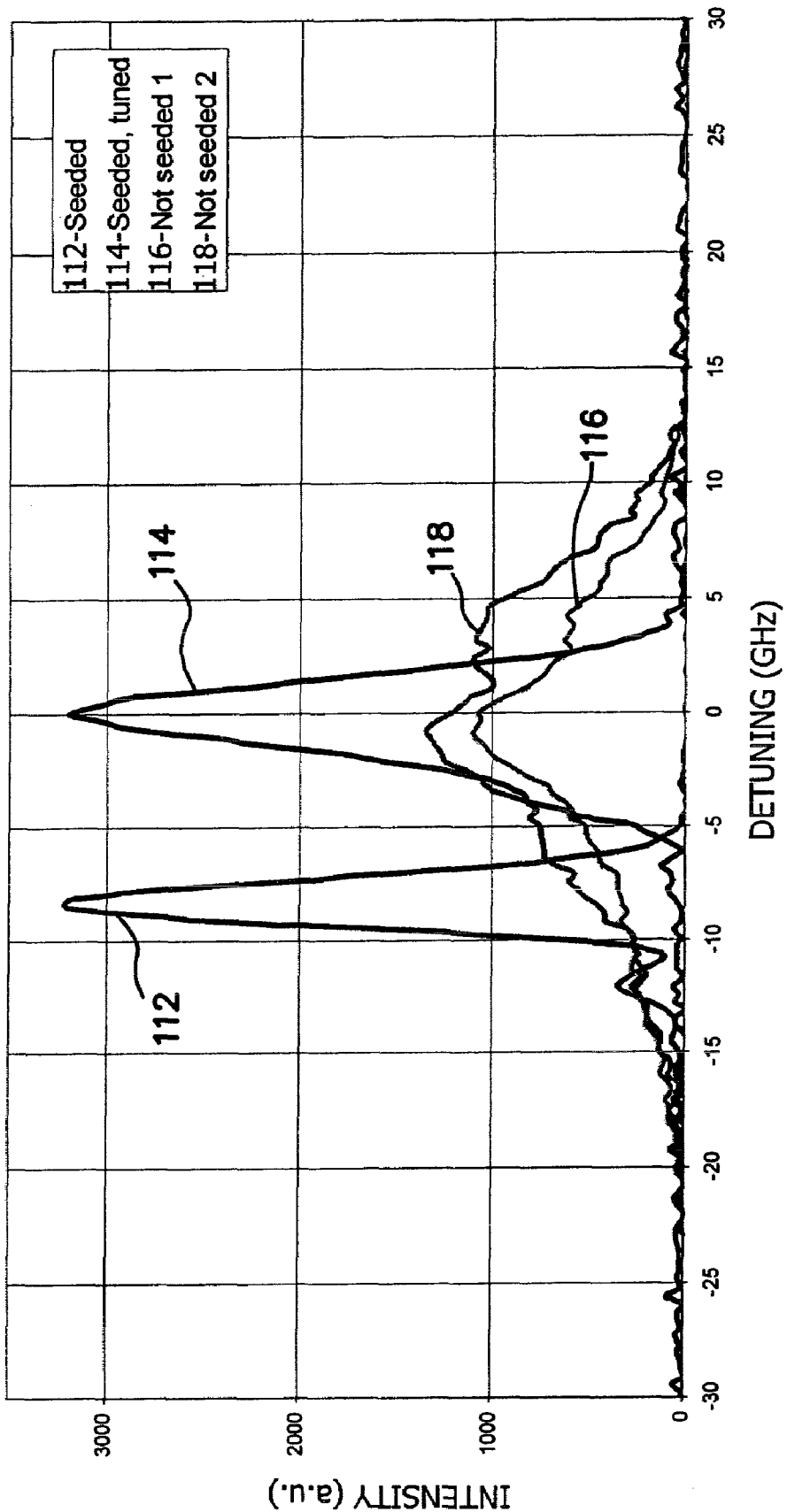
FIG. 17 is a graph of the spectrum of the seeded and the free running Nd:Yag laser (2 recordings). The seed laser was also re-tuned to assure a better spectral overlap between the seed and host lasers.

When the laser 38 is seeded, the optical bandwidth of the produced radiation is dramatically reduced. In the graph of FIG. 17, spectra are shown for the pulsed radiation with seeding on and off.

A 1-m spectrometer is fitted with a Pixelink PL A661 camera. The exit slit is opened completely and imaged with a 4× microscope objective on the CMOS chip. In the free running mode, a random, broad spectrum is generated. When seeded, the spectral distribution clearly narrows. The bump on the left side of the seeded peak 112 is an instrumental artifact. The recorded bandwidth of the seeded radiation is in this case limited by the instrument, a 1-meter spectrometer fitted with a CCD camera.

Figure 18:
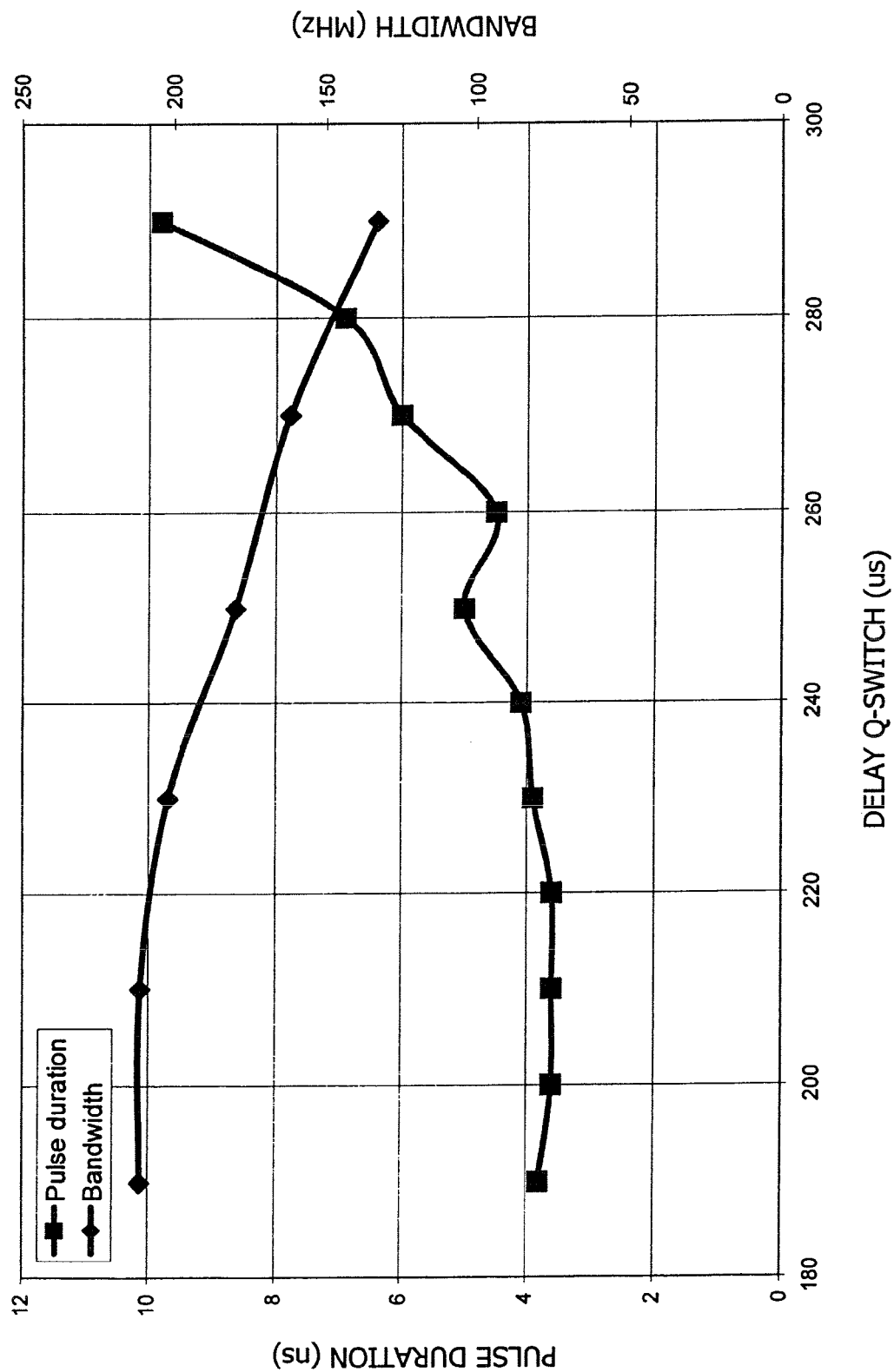
FIG. 18 is a graph of the pulse duration (FWHM) and bandwith obtained from the FWHM of etalon fringes. As the Q-switch delay of this laser is increased, the optical gain in the cavity is reduced and the duration of the produced pulses becomes longer. Seeding the longer pulsed results in a narrower bandwidth.
Figure 19:
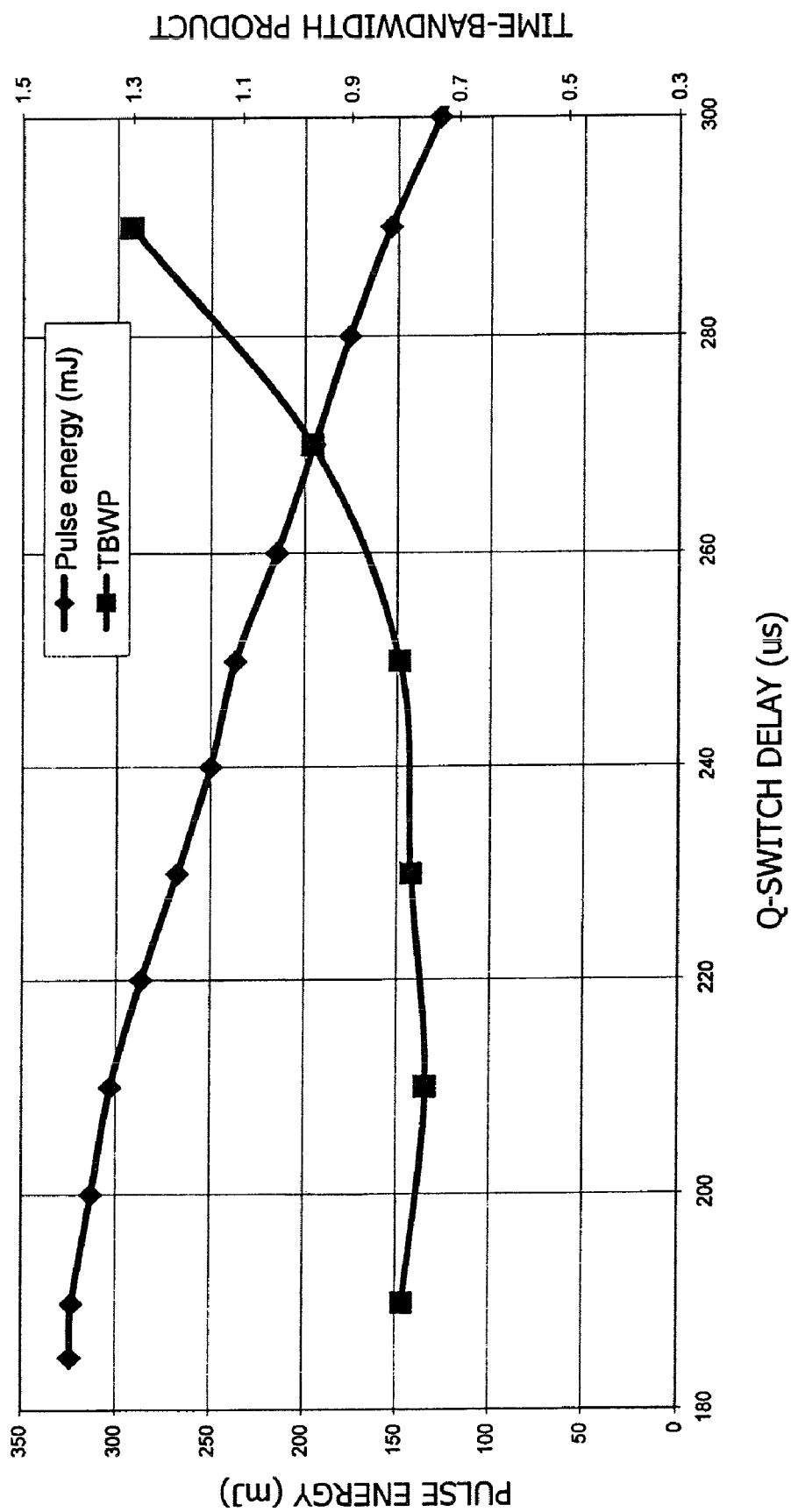
FIG. 19 is a graph of the pulse energy verses Q-switch delay and time-bandwidth product, obtained from the data shown in FIG. 18. When the Q-switch delay is increased the pulse-power is reduced. Also, at delays above 250 μs the TBW product deteriorates from 0.8 at full power to 1.3 at a delay setting of 290 μs.

Similar to that described above, the bandwidth of the generated radiation is recorded using a 1.5 GHz interferometer. The bandwidth is measured for various delay times of the Q-switch. At a longer delay time, the effective gain in the host laser 38 is lower, causing the generated pulses to become longer. Ideally, the bandwidth of the laser 38 should be reduced accordingly. As can be seen in the graphs of FIGS. 18 and 19, the bandwidth is indeed reduced. However, the time-bandwidth product deteriorate, from 0.8 at full power to 1.3 at a Q-switch delay setting of 290 µs. At this delay setting, the output power is reduced to less than a half.

The measurements presented here show clearly that the Quantel Brilliant A laser can be successfully be seeded using the same principles, by bringing in the seed laser via the output port, and using the RF-demodulation technique.

The above discussions demonstrate techniques for seeding and stabilizing a nanosecond Nd:Yag laser 38. Using the very fast (multiple GHz) electronic components designed for telecom applications, a feedback signal can be derived, which results in better experimental output. Advantageously, no modification (slowing down) of the Pockel's cell driver is required, resulting in timing accuracy and shorter output pulse in the seeded-pulse.

The feedback signal generated is a direct spectral observation of the laser pulse. As opposed to the cavity build-up time, the signal is a direct verification of a single longitudinal mode (SLM). The feedback loop may be computer controlled, allowing for the easy observation of the average piezo-voltage. Thus, the user can be warned when the piezo-electric element 92 inadvertently reaches its end and the lock loop may need to be restarted. A software may be used to operate an optical shutter, which is only opened when stable seeding is achieved, and is closed whenever a rise in the RF feedback signal is observed.

Although embodiments of the invention are discussed with respect to an Nd:YAG laser, those skilled in the art will recognize that techniques of the invention may be employed for stabilizing the seeding of other types of lasers and parametric systems. A particularly interesting application is the stabilization of a SLM OPO, which could be pumped by this laser.

Figure 20:
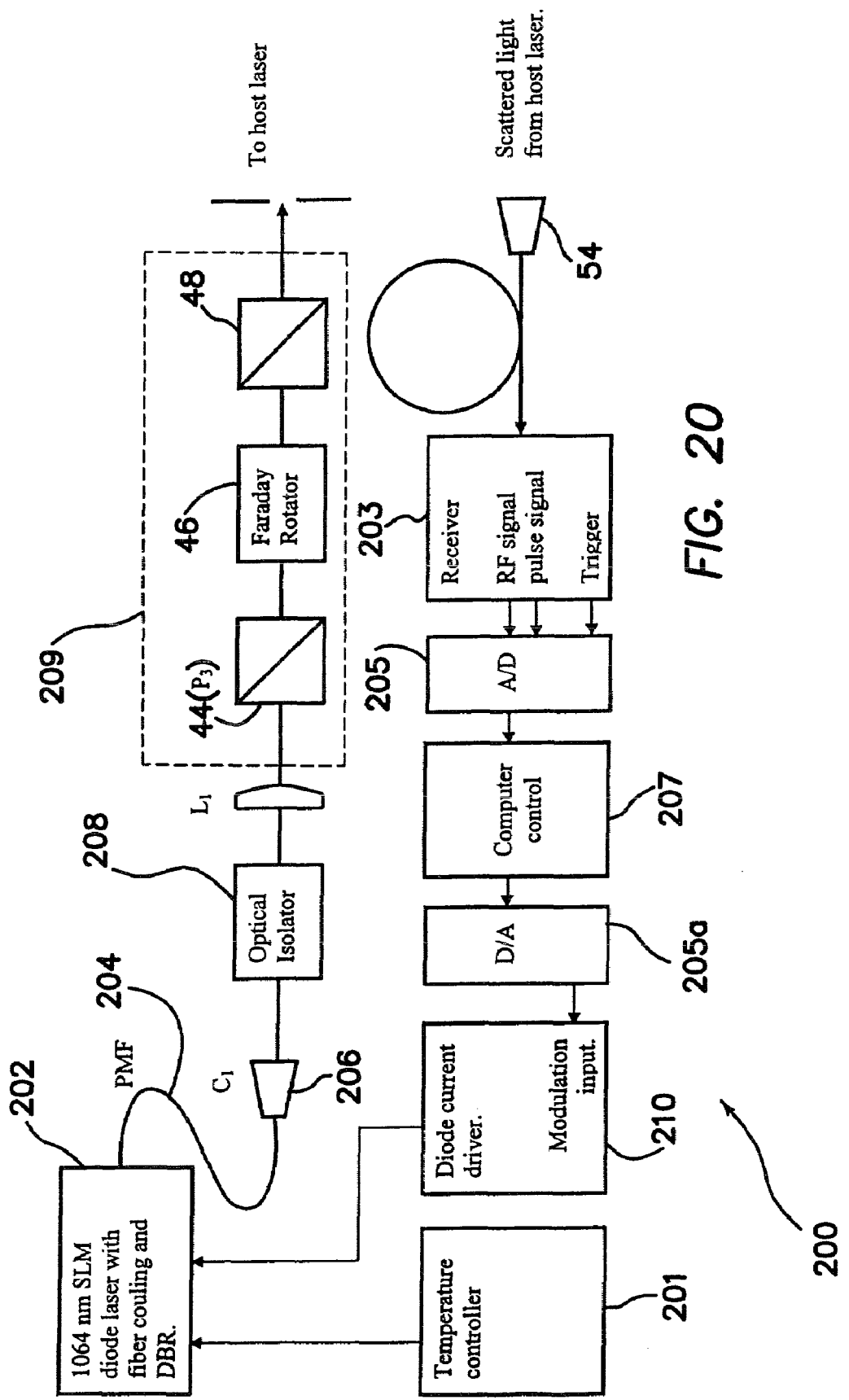
FIG. 20 is a block diagram a seeding system including a DBR laser diode in accordance with one embodiment of the invention.

For many applications, a pulse with a large coherence length is required while the exact wavelength is of less importance. For these applications, the seed laser 28 may be replaced with a tunable source. In this case, there it is not necessary to mount a piezo-electric element 32 in the host-laser 38. Instead, the wavelength of the seed-laser 28 may be dithered and continually adjusted. Under this principle, a system 200 in accordance with embodiments of the invention is illustrated in FIG. 20.

The cost of the seeder system can also be significantly reduced by replacing the Nd:YVO$_4$ (Vanadate) chip laser with a tunable source, for example, a 1064-nm diode laser assembly 202. The diode laser is also considerably smaller, and more rugged. The diode laser (not separately shown) is directly coupled into a single-mode optical fiber (not separately shown), which is fitted with a distributed Bragg reflector (DBR) (not separately shown). The reflector is placed close to the laser diode so that a short cavity is formed generating single longitudinal-mode radiation. This assembly 202 comprised of the diode laser, optical fiber and refector is mounted on a temperature controller 201, such as a Peltier element, which allows the accurate adjustment of its temperature, which in its turn allows the adjustment of the wavelength of the generated radiation.

The wavelength of the diode laser of assembly 202 is sensitive to its drive current. In accordance with an embodiment of the invention, the laser of assembly 202 is tunable at a rate of 395 MHz/mA. This allows tuning of the seed laser 28 to a longitudinal mode of the host laser 38, rather than adjusting the cavity length of the host laser 38. This approach does not require a cavity mirror of the host laser 38 coupled to a piezo-element, making the final design simpler to implement, less costly, and more sturdy and compact.

The center wavelength of the generated seeded radiation is expected to shift over time following a cavity mode of the host laser 38. In most applications where the radiation from the Nd:Yag laser 38 is not directly used for spectroscopic applications, shifting of the center wavelength of the seeded radiation is not a problem, and the large coherence length of the seeded host laser 38 is still maintained. In a few cases where the radiation or one of the harmonics of the host laser 38 is directly used for a spectroscopic application, adjusting the cavity length of the host laser 38 may still be needed.

The layout of a simplified system 200 to seed a Quantel Brilliant A Nd:Yag laser 38 is shown in FIG. 20. The light from the diode laser assembly 202 is delivered via a polarization maintaining fiber (PMF) 204 and is collimated using a collimator 206 ($C_1$). The beam having a power of 120 mW is passed trough an optical isolator 208 and is further collimated. The remaining of the system is similar to other embodiments of the invention discussed above. That is, the seed beam is further isolated from the host laser 38 with a second isolator including two calcite polarizers 44 ($P_3$), 48 ($P_4$) and a Faraday rotator 46. Also, similar to the other embodiments described above, the feedback signal is generated by detecting the RF modulation of the laser pulse.

The scattered light is picked up by the fiber coupler 54 and led into the receiver 203. An A/D converter 205 is used to convert the analog signal from the receiver 203 to a digital signal that can be used by a computer 207 to control the feedback process. A digital control output from the computer 207 is converted to an analog signal 205a, and the analog signal is used as the modulation input by the current driver 210 of the diode laser assembly 202, for controlling the wavelength of the seed laser and closing the control loop.

In an exemplary experimental setup, the optical isolator 209 uses an EOT model 2BIG1064, the lens $L_1$ has f=50 mm, the polarizers $P_3$ 44 and $P_4$ 48 are Calcite polarizers. The Faraday rotator 46 has an Isowave 2 mm aperture. A Newport 325 is used for the temperature controller 201, and a Newport 525 is used for the current driver 210.

Figure 21:
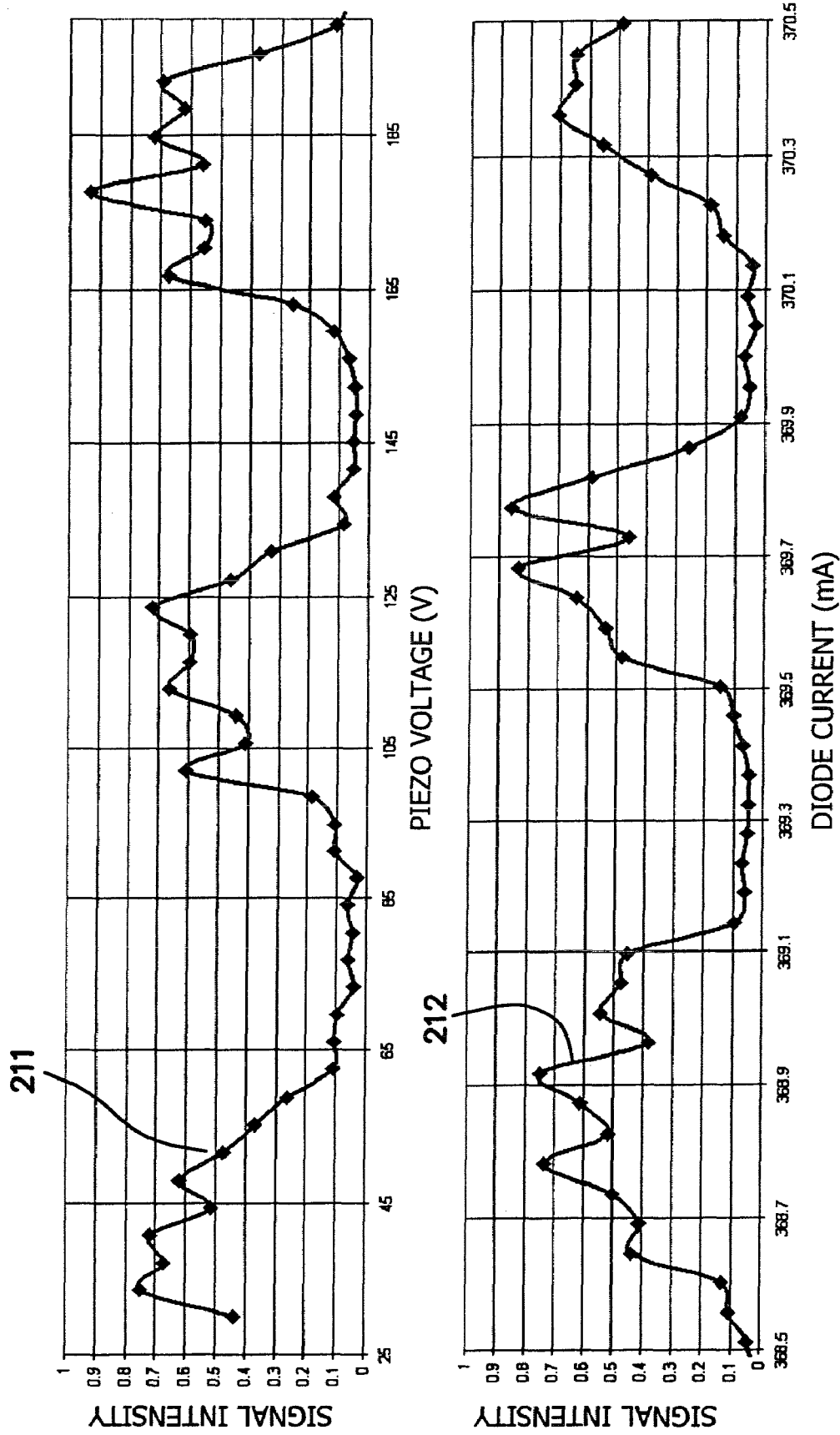
FIG. 21 is a graph of RF signals recorded for a DBR-diode-seeded Quantel Brilliant A laser. The top panel shows the signal for the case that the cavity mirror position is scanned using a piezo-electric element. The bottom panel shows the signal resulting from scanning the seed laser wavelength by varying the drive current.

RF signals on the laser pulse are recorded as shown in FIG. 21. The signal 211 in the top panel of FIG. 21 shows the case using a piezo-electric element on the cavity mirror of the host laser 38, for comparison with the signal 212 in the bottom panel that is obtained using the DBR laser diode of assembly 202 as the seed laser 28. As can be seen, the recorded signals 211 and 212 are very similar. Thus, the host laser 38 can be directly be stabilized by controlling the current through the laser diode of assembly 202.

Figure 22:
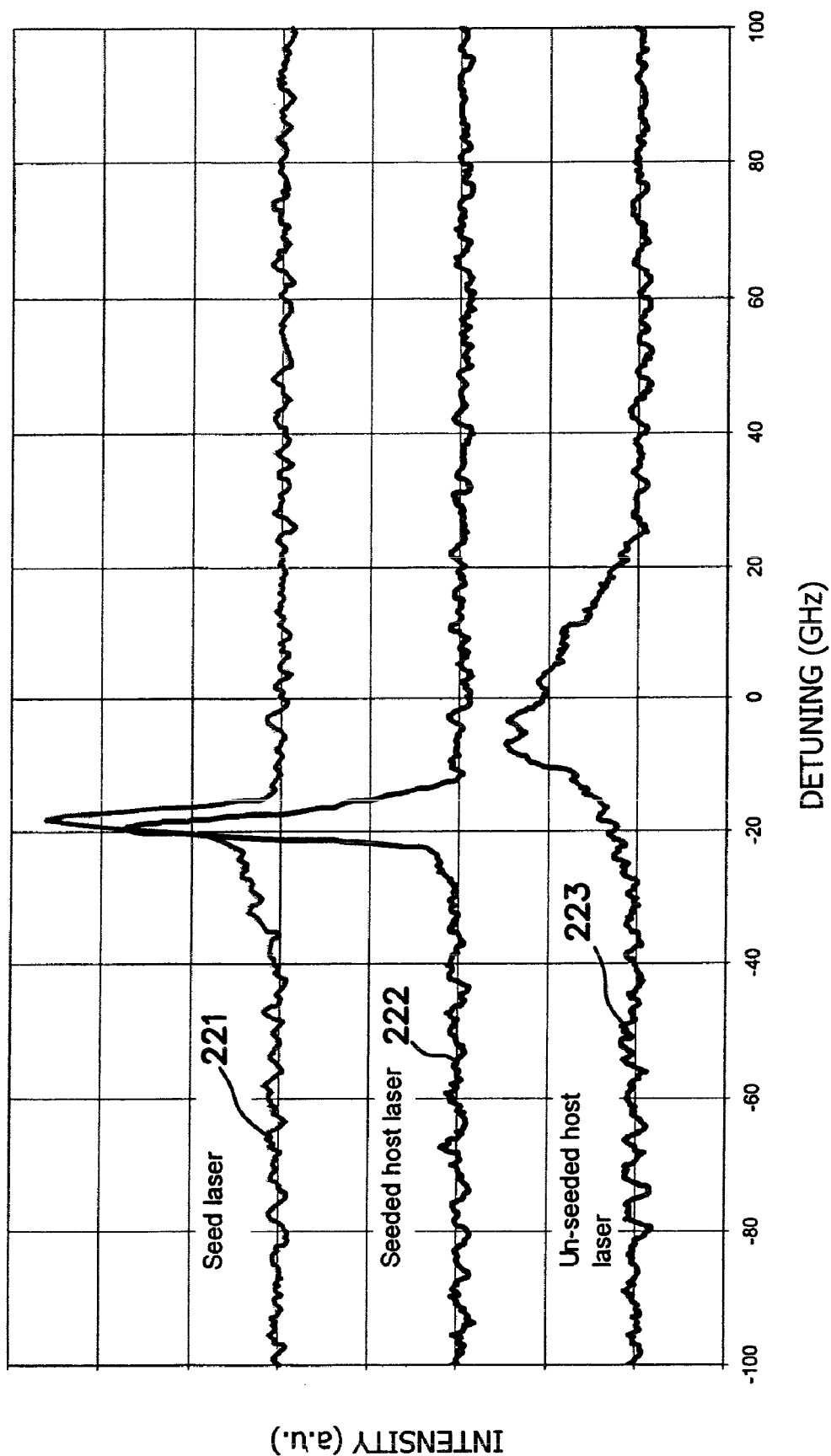
FIG. 22 is a graph of recorded spectra, including that for the seed laser (top), the seeded host laser (middle), and the free-running host laser (bottom). The seed laser, as shown, is not precisely tuned to the center of the wavelength of the free-running pulsed laser. However, it is close enough to obtain successful seeding.

The spectra of the seed radiation, the seeded host laser 38 and the unseeded host laser of FIG. 1a are shown as signals 221, 222, and 223, respectively in FIG. 22. Although the diode laser of assembly 202 is not precisely tuned to the center of the emission line of the free running laser 38 as shown, there is sufficient overlap to assure successful seeding.

Figure 23:
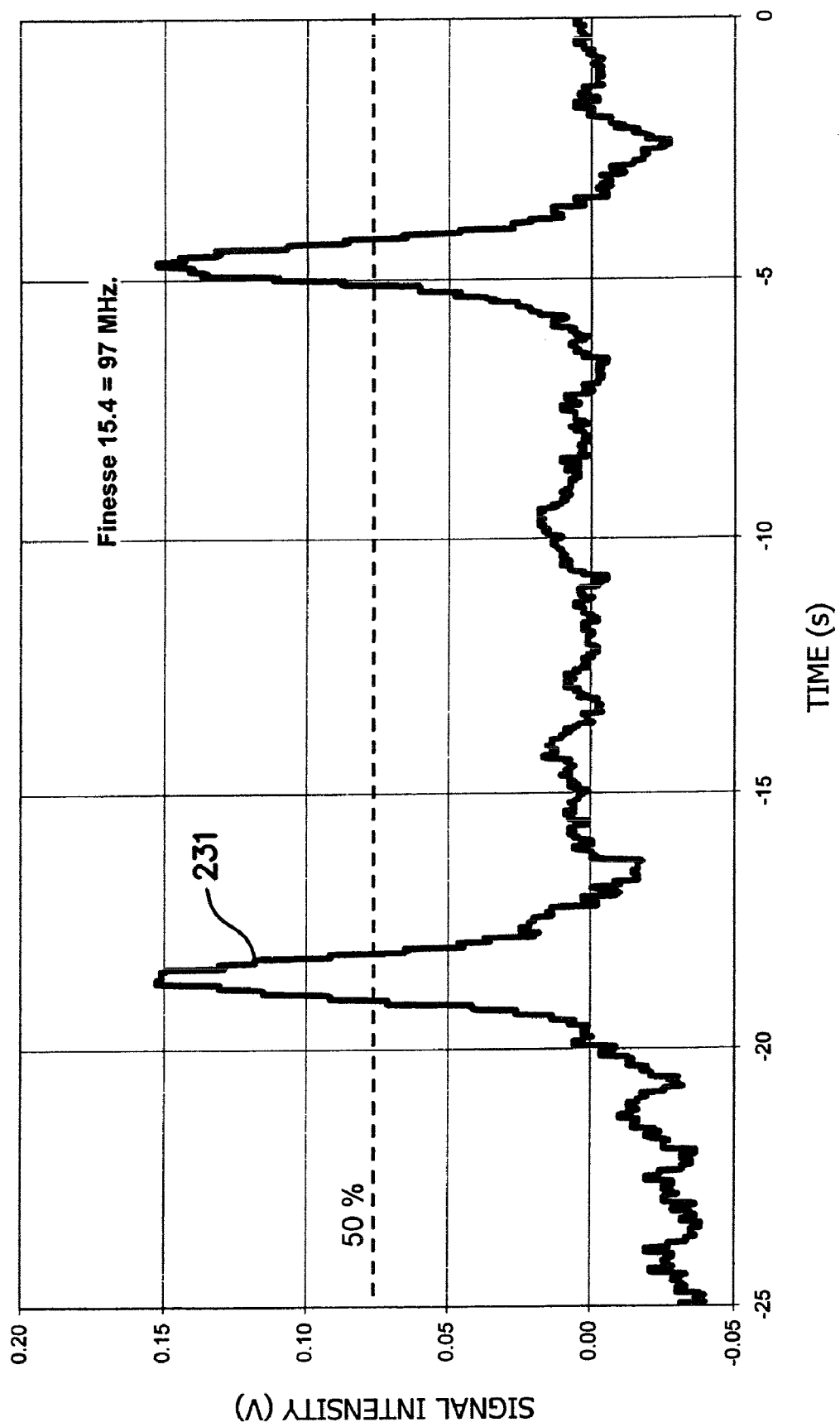
FIG. 23 is a graph of bandwidth measurement of the seeded lased with Q-switch delay 300 μs, stabilized with feedback to the drive current of the diode laser. Fringes are recorded with a 1.5 GHz Fabry-Perot interferometer (FPI). The bandwidth calculated by averaging five of such measurements is 97 MHz.

The bandwidth of the seeded laser 38 is measured using an FPI as described earlier. The bandwidth is recorded in a few measurements and then averaged. One of these measurements is shown as the signal intensity 231 in FIG. 23. The bandwidth obtained from this measurement, 97 MHz, is consistent with measurements for the same host laser 38 (Brilliant B, 300 μs Q-switch delay) obtained with the Nd:Vanadate seed laser 28.

Figure 24:
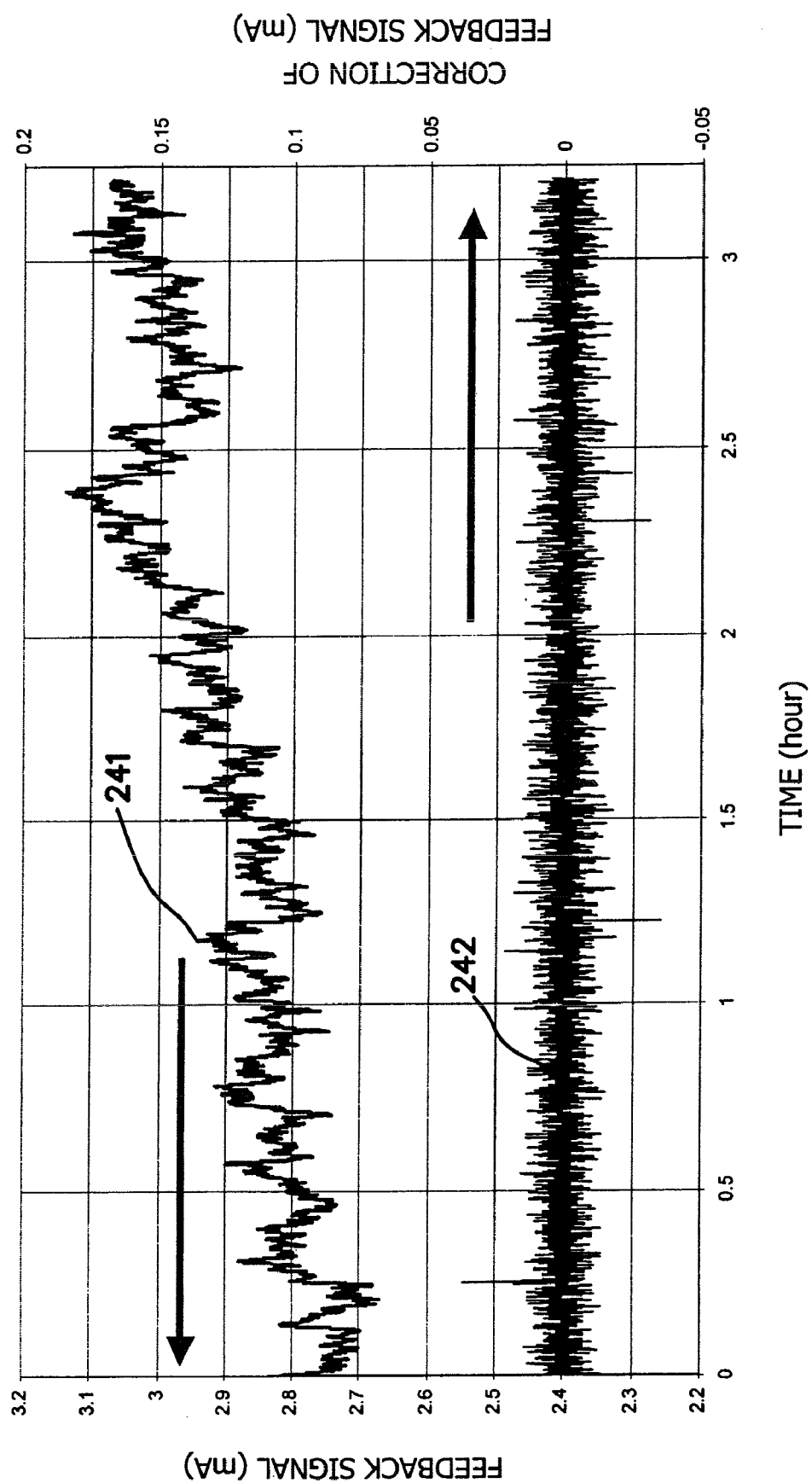
FIG. 24 is a graph of a feedback signal, and correction of the feedback signal recorded for more than 3 hours. In this period, not a single un-seeded shot was observed. At the termination of this measurement, the signals were stable. The seeding can be maintained for a considerably longer time.

The host laser 38 can be maintained in a stable state without observing a single unseeded shot for hours. As shown in FIG. 24, where the curve 241 represents the feedback signal and the curve 242 represents the correction of the feedback signal 242, the system is stable for a period over 3 hours.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method for seeding and stabilizing an optical device comprising:
    injecting the optical device with a seed signal;
    generating a detection signal of a high frequency modulation associated with an envelope of optical pulses produced by a beating between two or more of a plurality of longitudinal modes of the optical device;
    generating a feedback signal from an output of the optical device comprising detecting the high frequency modulation, and adjusting a wavelength of the seed signal or an optical length of an optical cavity of the optical device relative to each other to minimize the detected high frequency modulation so that the wavelength of the seed signal and one of a plurality of longitudinal modes of the optical device are matched;
    maintaining the match of the wavelength of the seed signal and one of a plurality of longitudinal modes of the optical device to provide stable operation of the optical device using the feedback signal; and
    wherein seeding the optical device comprises injecting the seed signal into the optical cavity of the optical device from outside the optical cavity through one of the optics that defines the optical cavity itself.

2. The method of claim 1, further comprising operating an optical shutter, wherein the shutter is only opened when a stable seeding is achieved, and is closed whenever a rise in the feedback signal is observed indicative of a rise in the modulation.

3. The method of claim 1, wherein introducing a seed beam into the cavity of the optical device from outside of the cavity of the optical device through one of the optics that defines the optical cavity itself comprises introducing a seed beam into the cavity of the optical device using a polarizer in front of one of the optics that defines the optical cavity of the optical device.

4. The method of claim 1, wherein the optical device is a Q-switched pulsed laser.

5. The method of claim 1, wherein the optical device is a Q-switched Nd:YAG laser.

6. The method of claim 1, wherein seeding the optical device with a seed signal comprises generating the seed signal from a tunable laser.

7. The method of claim 1, wherein adjusting the wavelength of the tunable laser to maintain the stable operation of the optical device comprises dithering the wavelength of the tunable laser to maintain the stable operation.

8. The method of claim 1, wherein adjusting a drive current for a tunable source for generating the seed signal comprises adjusting a tunable distributed Bragg reflector (DBR) laser.

9. The method of claim 1, further comprising adjusting a cavity length of the optical device.

10. An apparatus comprising:
   an optical device having an optical cavity defined by optics included as part of the optical device;
   a seed laser for generating a single mode seed signal coupled to the optical device;
   a feedback generator coupled to the output of the optical device for generating a feedback signal comprising a detector of a detection signal of a high frequency modulation associated with an envelope of optical pulses produced by a beating between two or more of a plurality of longitudinal modes of the optical device,
   a feedback circuit for generating a feedback signal from an output of the optical device comprising:
      a detector for detecting the high frequency modulation;
      means for adjusting a wavelength of the seed signal and an optical length of an optical cavity of the optical device relative to each other to minimize the detected high frequency modulation so that one of a plurality of longitudinal modes of the optical device are matched to the wavelength of the seed signal;
   means for maintaining the match of the wavelength of the seed signal and one of a plurality of longitudinal modes of the optical device to provide stable operation of the optical device using the feedback signal; and
   wherein the seed laser injects the seed signal into the optical cavity of the optical device from outside the optical cavity through one of the optics that defines the optical cavity itself.

11. The apparatus of claim 10, further comprising operating an optical shutter which is only opened when a stable seeding is achieved, and is closed whenever a rise in the feedback signal is observed indicative of a rise in the modulation.

12. The apparatus of clam 10, wherein the seed laser introduces a seed beam into the cavity of the optical device from the outside of the cavity of the optical device through one of the optics that defines the optical cavity itself and through a polarizer in front of the cavity of the optical device, the optical device further comprising two compensating polarizers to substantially control reflected unpolarized light components.

13. The apparatus of claim 10, wherein the optical device is a Q-switched pulsed laser or a Q-switched Nd:YAG laser.

14. The apparatus of claim 10, wherein the means for adjusting the wavelength of the seed laser comprises a distributed Bragg reflector (DBR) laser and a current driver.

15. The apparatus of claim 10, wherein the means for adjusting the wavelength of the seed laser comprises a temperature controller.

16. The apparatus of claim 10, further comprising means for adjusting a length of the optical cavity of the optical device.

* * * * *